US011076201B2

(12) United States Patent
Lavie

(10) Patent No.: US 11,076,201 B2
(45) Date of Patent: Jul. 27, 2021

(54) SYSTEMS AND METHODS FOR PROVIDING TO A USER A PERSONALIZED VIEWING EXPERIENCE OF A CONTENT ITEM

(71) Applicant: COMIGO LTD., Yarkona (IL)

(72) Inventor: Motty Lavie, Tel Aviv (IL)

(73) Assignee: COMIGO LTD., Yarkona (IL)

( * ) Notice: Subject to any disclaimer, the term of this patent is extended or adjusted under 35 U.S.C. 154(b) by 92 days.

(21) Appl. No.: 16/543,559

(22) Filed: Aug. 18, 2019

(65) Prior Publication Data
US 2020/0077142 A1 Mar. 5, 2020

Related U.S. Application Data

(60) Provisional application No. 62/724,964, filed on Aug. 30, 2018.

(51) Int. Cl.
| | | |
|---|---|---|
| *H04N 7/10* | (2006.01) | |
| *H04N 7/025* | (2006.01) | |
| *H04N 21/4402* | (2011.01) | |
| *H04N 21/84* | (2011.01) | |
| *H04N 21/442* | (2011.01) | |
| *H04N 21/45* | (2011.01) | |

(52) U.S. Cl.
CPC .. *H04N 21/44029* (2013.01); *H04N 21/44209* (2013.01); *H04N 21/4532* (2013.01); *H04N 21/8402* (2013.01)

(58) Field of Classification Search
CPC .......... H04N 21/2358; H04N 21/4358; H04N 21/4402; H04N 21/44029; H04N 21/4532; H04N 21/4545; G06F 3/0484
See application file for complete search history.

(56) References Cited

U.S. PATENT DOCUMENTS

| | | | |
|---|---|---|---|
| 4,507,680 A | | 3/1985 | Freeman |
| 5,600,368 A | | 2/1997 | Matthews, III |
| 5,692,212 A | | 11/1997 | Roach |
| 6,144,375 A | | 11/2000 | Jain et al. |

(Continued)

FOREIGN PATENT DOCUMENTS

WO      0028731 A1    5/2000

OTHER PUBLICATIONS

Press A to change your life: 'Otis' and the new American cinema—published on Sep. 8, 2017 on www.engadget.com.

(Continued)

*Primary Examiner* — Gigi L Dubasky
(74) *Attorney, Agent, or Firm* — Marc Van Dyke; Momentum IP

(57) ABSTRACT

Methods and systems for customizing a video content item according to personal preferences of at least first and second users, while keeping a common storyline for all customizations of the video content item. Each of the first and second users is associated with a terminal. For each of the first and second users, multi-purpose preferences of the user are obtained, and subsequently a version of the video content item is automatically selected from multiple versions of the video content item. The automatic selection for each user is based on the multi-purpose preferences of that user. Following the automatic selection, the version of the video content item selected for each user is displayed to that user on the associated terminal.

19 Claims, 9 Drawing Sheets

(56) References Cited

U.S. PATENT DOCUMENTS

| | | | |
|---|---|---|---|
| 6,243,085 B1 | 6/2001 | Roach | |
| 8,607,287 B2* | 12/2013 | Walker | H04N 21/4621 |
| | | | 725/95 |
| 10,088,983 B1* | 10/2018 | Qaddoura | H04N 21/23439 |
| 10,353,945 B2* | 7/2019 | Hedinsson | G06F 16/48 |
| 2002/0120931 A1* | 8/2002 | Huber | H04N 21/25891 |
| | | | 725/34 |
| 2007/0070210 A1 | 3/2007 | Piccionelli et al. | |
| 2013/0031590 A1* | 1/2013 | Ivanov | H04N 21/4126 |
| | | | 725/110 |
| 2018/0124144 A1* | 5/2018 | Gonzalez | H04N 21/251 |
| 2018/0357981 A1* | 12/2018 | Ng | G09G 5/12 |

OTHER PUBLICATIONS

Interactive Films You (the Viewer) Control are in Production—published on Oct. 4, 2017 on guharrison.com.

* cited by examiner

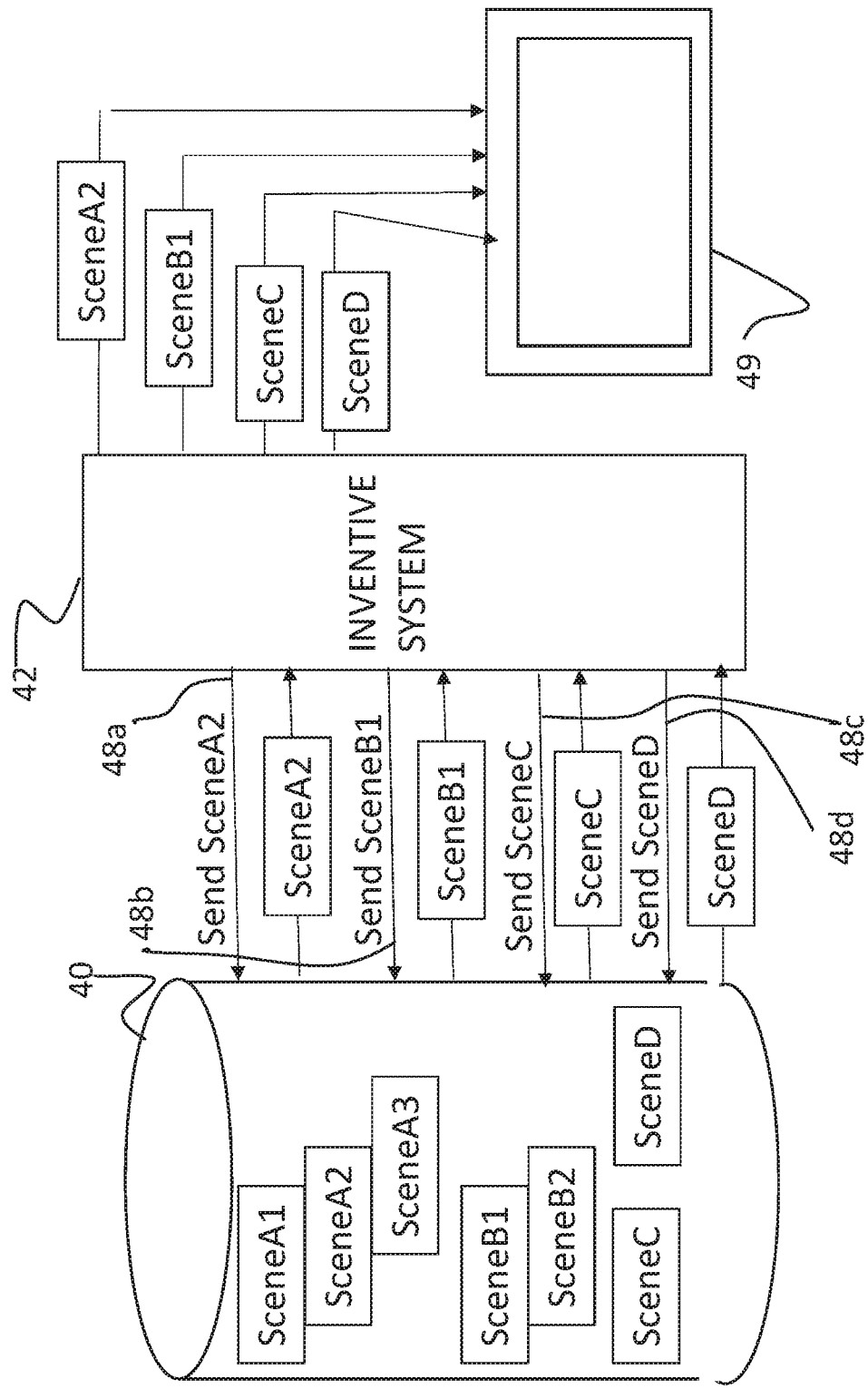

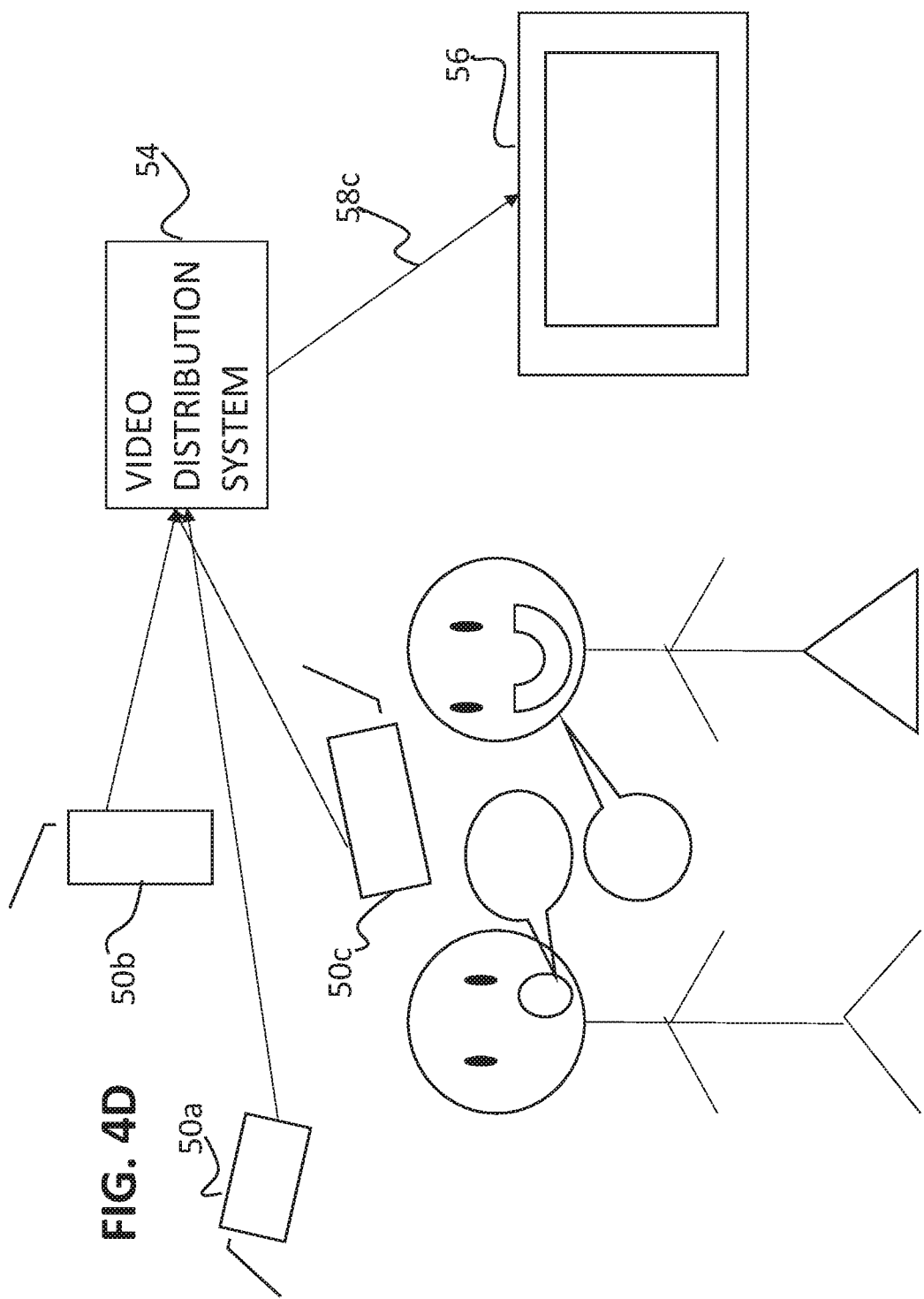

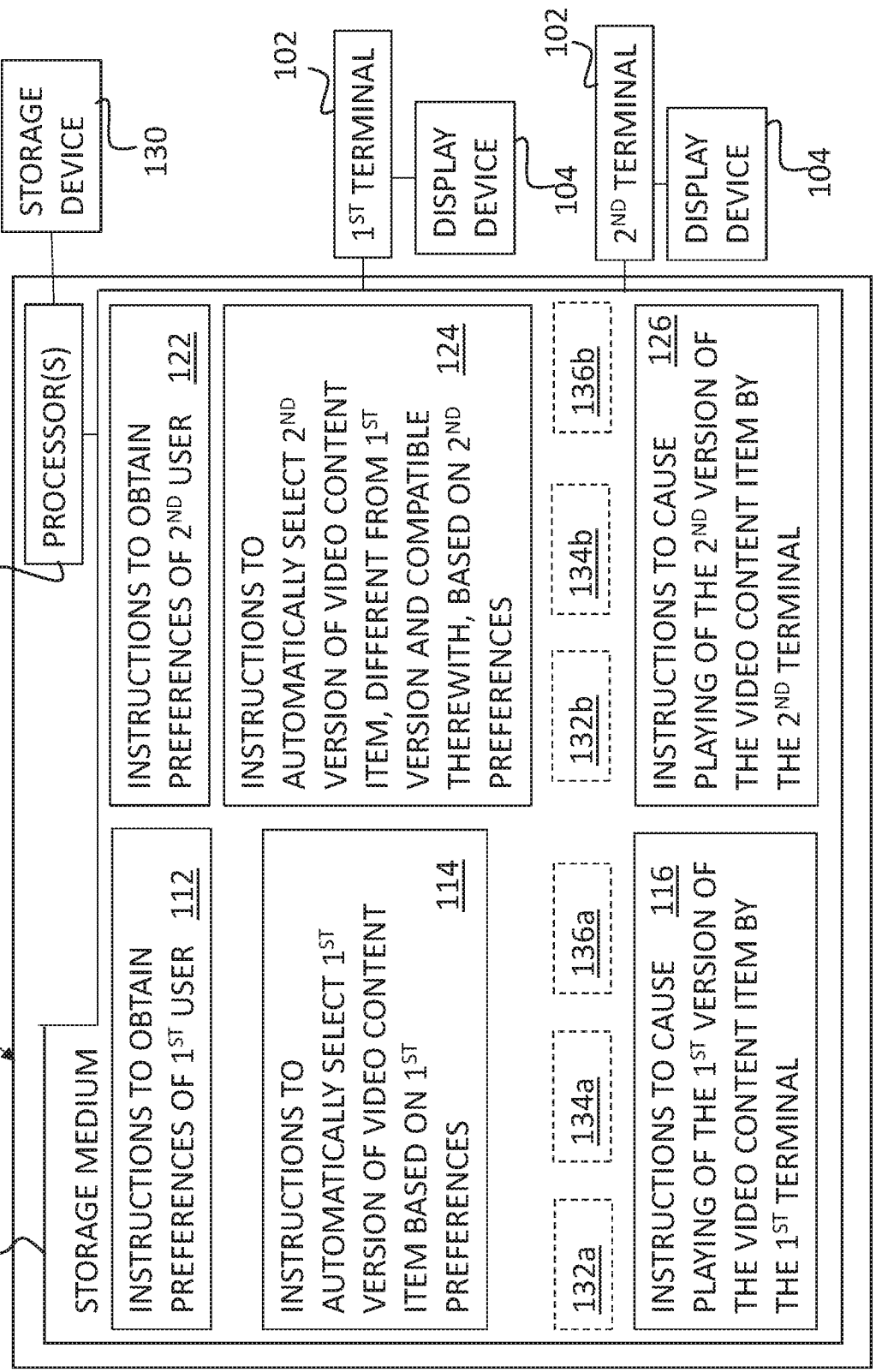

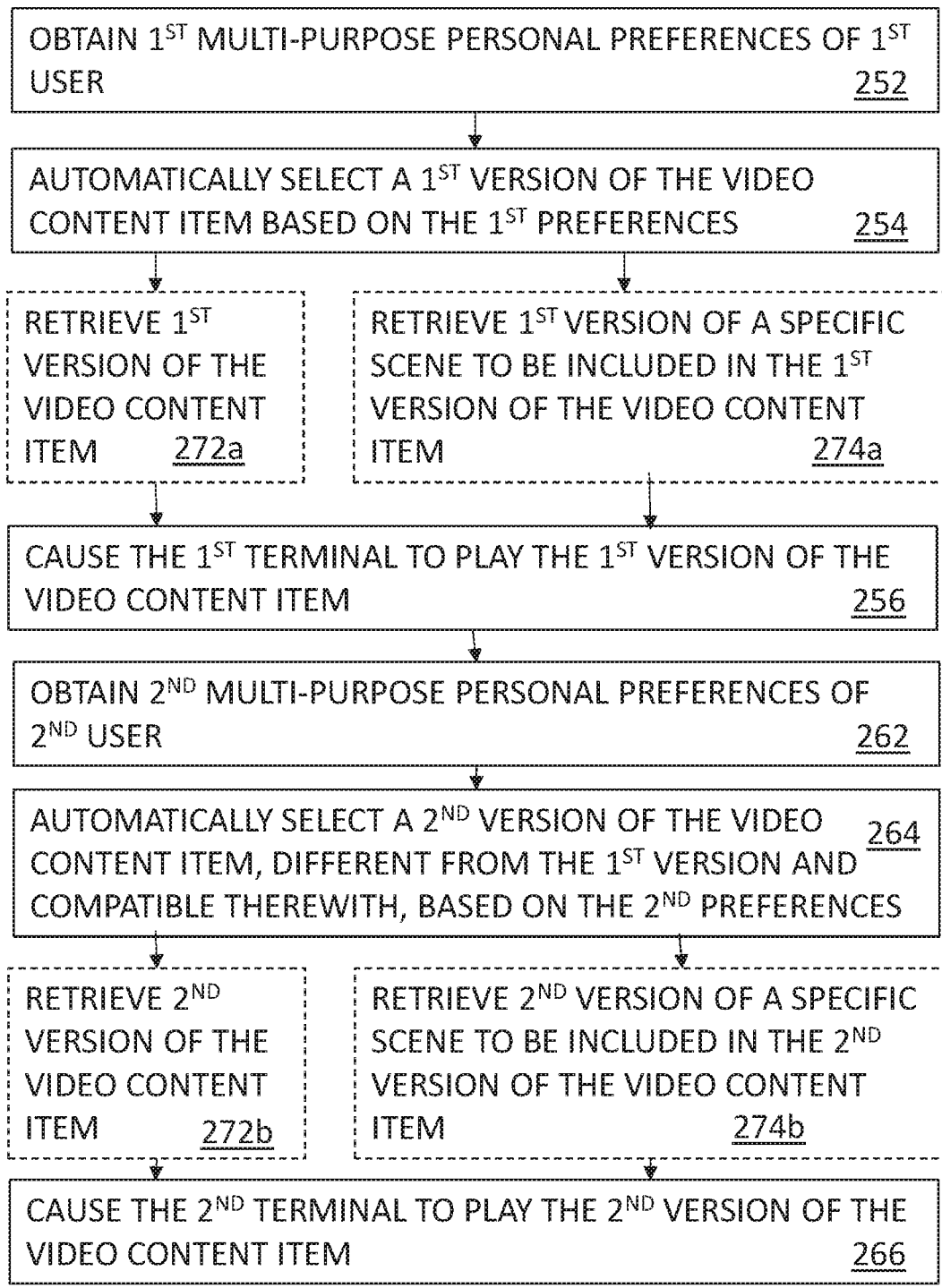

SYSTEMS AND METHODS FOR PROVIDING TO A USER A PERSONALIZED VIEWING EXPERIENCE OF A CONTENT ITEM

RELATED APPLICATION

The present application gains priority from U.S. Provisional Patent Application 62/724,964 filed Aug. 30, 2018, and entitled "Personalized Viewing Experience of a Content Item", which is incorporated herein by reference as if fully set forth herein.

FIELD AND BACKGROUND OF THE INVENTION

The invention, in some embodiments, relates to displaying of one or more video content items, and more particularly to methods and systems for customizing the display of the one or more video content items to personal preferences of users viewing the content item(s).

In recent years, it has become common practice in video content distribution systems to customize the content provided to users according to each user's specific preferences. As such, different users may receive different recommendations for video content items to watch, or may be provided with different default playlists of video content items, particularly when no explicit requests for desired content are provided by the users. Additionally, a single user may receive different recommendation at different times, for example if his or her user preferences have changed in the interim between the two different times.

Customizing of delivered content is achieved based on the personal preferences of each specific user. Those personal preferences may be manually defined by the user, or may be automatically obtained, for example by monitoring the user's content watching history and deducing his preferences.

Thus, a video distribution system of a TV operator may provide to a first user a movie starring Silvester Stallone, based on determining that the first user is a fan of Stallone, while at the same time the same system may provide to a second user an episode of "Friends", based on determining that the second user is a fan of the TV show "Friends".

The Problem to Solve

Algorithms for customization of video content items currently implemented by existing video content distribution systems are rather "coarse". Such algorithms are based on selection between different video content items, such that a first user receives a first video content item (e.g. a movie having a certain characteristic favored by the first user), while a second user receives a second video content item (e.g. a TV episode having a certain characteristic favored by the second user).

It is not currently possible to perform "fine" customizations, which customize a specific video content item to personal preferences of users, so that different users having different preferences will receive and see slightly different versions of the same video content item.

Consider the following examples:

A. Consider a broadcast of a tennis game (e.g. between Nadal and Federer). Typically, the broadcasting network installs several cameras at different angles and locations around the court, which cameras operate in parallel. For example, a first camera may be placed behind the player at a first end of the court (e.g. Nadal), a second camera may be placed behind the player at the second, opposing end of the court (e.g. Federer), a third camera may be looking at the court from the side, a fourth camera may be looking at the court from above, etc. During broadcasting of the game, the director of the broadcast switches between the multiple cameras, attempting to pick the most interesting picture or angle at each point in time.

However, a first user may be a fan of Nadal and may prefer to see Nadal's face and movements at all times. Similarly, a second user may be a fan of Federer and may prefer to see Federer's face and movements at all times. A third user may be neutral, not having preference between the two players, and therefore may prefer to see the match from the side.

Using current video content distribution systems, all users have no choice but to watch the match from the point-of-view selected by the director. Thus, each of the three users mentioned above will see the match from their preferred point-of-view only during some time intervals at which the user's desired point-of-view coincides with the director's current choice of camera. During the rest of the time, each of the users will see the match from a point-of-view he does not like.

B. Consider a movie including a scene in which the two main actors of the movie (e.g. Julia Roberts and Richard Gere) conduct a face-to-face conversation. Typically, during a conversation, the camera repeatedly switches between the faces of the two actors, such that at each point in time the video content item shows the face of the actor currently talking. When no one is talking, the director decides whose face will be shown, based on other considerations.

However, a first user may be a fan of Julia Roberts and may prefer to see her face for as long as possible. Similarly, a second user may be a fan of Richard Gere and may prefer to see his face for as long as possible. A third user may have no preference between these two actors, and may prefer seeing the conversation from the side, where both actors are seen together.

With current video content distribution systems (and with current movie production procedures), all users have no choice but to watch the movie from the perspective selected by the movie's director, which is selected according to preferences of the director. Thus, each of the three users mentioned above will see the movie from his preferred angle, or view point, only during some time intervals in which his desired view point coincides with the director's pre-defined selection.

C. Consider a movie including a scene in which the main actor appears alone, hesitating for a while before making an important decision. During the scene, the camera may repeatedly switch between a zoom-in state which shows only a close-up view of the actor's face and a zoom-out state which shows the upper part of the actor's body or his whole body. The sequence of transitions between zoom-in and zoom-out states is decided by the movie's director, according to his artistic considerations.

However, a first user may prefer watching faces at close-up so that he can clearly see every facial expression of the person being watched. A second user may prefer watching the full bodies of the people so that he can detect the body language of the person being watched.

With current video content distribution systems (and with current movie production procedures), all users have no choice but to watch the movie using a zoom level determined by the movie's director. Thus, each of the two users mentioned above will see the movie from his preferred zoom level of watching a person only during some time intervals in which his desired zoom level coincides with the director's pre-defined selection.

D. The previous example is a special case of the more general trade-off between level-of-detail and field-of-view. One user may prefer seeing more details of a scene even at the cost of watching a narrower field-of-view, while another user may prefer seeing a broader field-of-view even at the cost of losing some details.

E. Consider a movie including a scene in which the two main actors of the movie (e.g. Julia Roberts and Richard Gere) watch together the occurrence of a certain event, while standing at slightly different locations. Because of the slightly different locations, some details of the event may be seen by the two actors in a slightly different way. For example, a first object may hide some details of the event from Julia Roberts and not hide them from Richard Gere, while a second object may hide some details of the event from Richard Gere and not hide them from Julia Roberts. During the scene, the camera may show the events (i) from Julia Roberts' point-of-view, (ii) from Richard Gere's point of view, or (iii) from another point of view. The point-of-view shown in the movie is selected by the director of the movie according to his artistic considerations.

However, a first user may be a fan of Julia Roberts and may prefer to see her view of the event. Similarly, a second user may be a fan of Richard Gere and may prefer to see his view of the event. A third user may have no preference between the views seen by the two actors, and may like seeing the events with as many details as possible.

With current video content distribution systems (and with current movie production procedures), all users have no choice but to watch the movie from the point of view selected by the movie's director. Thus, a user whose preferred point-of-view does not coincide with the point-of-view selected by the director will have to watch the events from a less-preferred point-of-view.

It should be noted that in all the above examples, the different users want to see the same storyline and not different storylines. The preferences and/or desires of the users are only related to the specific way in which the storyline facts are displayed, but are not related to changing the facts of the storyline. This is different from customization of the video for two users where one user prefers happy endings and another user prefers said endings, such that the customization according to user preferences may result in one version of an action movie having an ending in which the hero survives and another version of the same movie having an ending in which the hero gets killed.

It should also be noted that in all the examples discussed above, the user preferences according to which the selections are made are pre-defined, and are set prior to watching the video content whose viewing experience is affected by those preferences. This is different from real-time adjustments of the viewing experience based on real-time measurements of bio-feedback, such as when adjusting the pace or intensity of a game based on pulse rate measurements, or based on user input provided in real time, for example when the user selects, in real time, the camera angle or view point he wishes to see right now.

There is thus a need in the art for a method for providing to users ways of watching video content items that are customized according to their personal preferences in a "fine" way, such that the same video content item (with the same storyline) is seen in somewhat different ways by different users having different preferences.

SUMMARY OF THE INVENTION

Some embodiments of the invention relate to displaying of video content, and more particularly to methods and systems for customizing the display of one or more video content items to personal preferences of users viewing the content item(s).

According to an aspect of an embodiment of the invention, there is provided a method for customizing a video content item according to personal preferences of at least first and second users, while keeping a common storyline for all customizations of the video content item, wherein the first user is associated with a first terminal and the second user is associated with a second terminal, the method including:

a. obtaining first one or more multi-purpose personal preferences of the first user;

b. subsequent to the obtaining of the first one or more multi-purpose personal preferences, automatically selecting a first version of the video content item from multiple versions of the video content item, the automatically selecting of the first version of the video content item being based on the first one or more multi-purpose personal preferences;

c. subsequent to the automatically selecting of the first version of the video content item, causing a first playing of the first version of the video content item on a display device associated with the first terminal;

d. obtaining second one or more multi-purpose personal preferences of the second user, the second one or more multi-purpose personal preferences being different from the first one or more multi-purpose personal preferences;

e. subsequent to the obtaining of the second one or more multi-purpose personal preferences, automatically selecting a second version of the video content item from the multiple versions of the video content item, wherein (i) the second version of the video content item is different from the first version of the video content item, (ii) the second version of the video content item is compatible with the first version of the video content item, and (iii) the automatically selecting of the second version of the video content item is based on the second one or more multi-purpose personal preferences; and f. subsequent to the automatically selecting of the second version of the video content item, causing a second playing of the second version of the video content item on a display device associated with the second terminal.

In some embodiments, the second version of the video content item is strictly compatible with the first version of the video content item.

In some embodiments, the second user is different from the first user. In other embodiments, the second user and the first user are the same user.

In some embodiments, the second terminal is different from the first terminal. In other embodiments, the second terminal and the first terminal are the same terminal.

In some embodiments, the causing the first playing and the causing the second playing include causing at least a portion of the first playing and at least a portion of the second playing to occur simultaneously.

In some embodiments:
(i) the first version of the video content item includes a first version of a video scene;
(ii) the second version of the video content item includes a second version of the video scene, such that the first version of the video scene and the second version of the video scene are compatible with each other;
(iii) during a first portion of the first version of the video scene, which first portion includes an occurrence of an event, the first version of the video scene provides a view of an entirety of the event as taken by a first camera; and
(iv) during a second portion of the second version of the video scene, which second portion includes the occurrence of the event, the second version of the video scene provides a view of the entirety of the event as taken by a second camera, different from the first camera.

In some embodiments:
(i) the first version of the video content item includes a first version of a video scene;
(ii) the second version of the video content item includes a second version of the video scene, such that the first version of the video scene and the second version of the video scene are compatible with each other;
(iii) during the first version of the video scene, a specific person is shown for a first accumulated amount of time; and
(iv) during the second version of the video scene, the specific person is shown for a second accumulated amount of time, different from the first accumulated amount of time.

In some embodiments:
(i) the first version of the video content item includes a first version of a video scene;
(ii) the second version of the video content item includes a second version of the video scene, such that the first version of the video scene and the second version of the video scene are compatible with each other;
(iii) during the first version of the video scene, the face of a specific person is shown for a first accumulated amount of time; and
(iv) during the second version of the video scene, the face of the specific person is shown for a second accumulated amount of time, different from the first accumulated amount of time.

In some embodiments:
(i) the first version of the video content item includes a first version of a video scene;
(ii) the second version of the video content item includes a second version of the video scene, such that the first version of the video scene and the second version of the video scene are compatible with each other;
(iii) during a first portion of the first version of the video scene, which first portion includes an occurrence of an event, the first version of the video scene provides a view of an entirety of the event using a first field of view; and
(iv) during a second portion of the second version of the video scene, which second portion includes the occurrence of the event, the second version of the video scene provides a view of the entirety of the event using a second field of view, different from the first field of view.

In some embodiments:
(i) the first version of the video content item includes a first version of a video scene;
(ii) the second version of the video content item includes a second version of the video scene, such that the first version of the video scene and the second version of the video scene are compatible with each other;
(iii) during a first portion of the first version of the video scene, which first portion includes an occurrence of an event, the first version of the video scene provides a view of an entirety of the event as it is seen by a first character participating in the video content item; and
(iv) during a second portion of the second version of the video scene, which second portion includes the occurrence of the event, the second version of the video scene provides a view of the entirety of the event as it is seen by a second character participating in the video content item, the second character being different from the first character.

In some embodiments, the multiple versions of the video content item are prepared and stored in advance. In some such embodiments, the multiple versions of the video content item, including the first version of the video content item and the second version of the video content item, are stored in a non-volatile storage device, and the method further includes:
g. prior to the causing of the first playing, retrieving the first version of the video content item from the non-volatile storage device; and
h. prior to the causing of the second playing, retrieving the second version of the video content item from the non-volatile storage device.

In some embodiments, the multiple versions of the video content item are not prepared in advance.

In some such embodiments, multiple versions of one or more scenes are prepared and stored in advance, and the version of the video content item to be played is assembled prior to starting playing it.

In some of those embodiments, for at least one specific video scene of the video content item, multiple versions of the specific video scene are stored in a non-volatile storage device, and the method further includes:
g. prior to the causing of the first playing, retrieving from the non-volatile storage device a first version of the specific video scene, the retrieved first version of the specific video scene being included in the first playing of the video content item; and
h. prior to the causing of the second playing, retrieving from the non-volatile storage device a second version of the specific video scene, different from the retrieved first version of the specific video scene, the retrieved second version of the specific video scene being included in the second playing of the video content item.

In other embodiments in which the multiple versions of the video content item are not prepared in advance, multiple versions of one or more scenes are prepared and stored in advance, and the version of the video content item to be played is never assembled, but is constructed dynamically while the video content item is being played.

In some such embodiments, for at least one specific video scene of the video content item, multiple versions of the specific video scene are stored in a non-volatile storage device, and the method further includes:
g. retrieving from the non-volatile storage device, subsequent to starting the first playing of the video content item by the first terminal, a first version of the specific video scene, the retrieved first version of the specific video scene being included in the first playing of the video content item; and h. retrieving from the non-volatile storage device, subsequent to starting the second playing of the video content item by the second terminal, a second version of the specific video scene, different from the retrieved first version of the specific video scene, the retrieved second version of the specific video scene being included in the second playing of the video content item.

In some embodiments, the first and second versions of the video content item are taken from two cameras covering the same broadcast program. In some such embodiments, (i) the first playing and the second playing of the video content item include real-time broadcasts of a common event, (ii) during a first portion of the first version of the video content item, which first portion includes the common event, the first version of the video content item provides a view of an entirety of the common event as taken by a first camera, and (iii) during a second portion of the second version of the video content item, which second portion includes the occurrence of the common event, the second version of the video content item provides a view of the entirety of the common event as taken by a second camera, different from the first camera.

In some embodiments, the obtaining of the first one or more multi-purpose preferences of the first user includes receiving at least some of the one or more multi-purpose personal preferences of the first user from the first user. For example, the first user may provide the multi-purpose personal preferences manually.

In some embodiments, the obtaining of the first one or more multi-purpose preferences of the first user includes automatically deriving at least some of the one or more multi-purpose personal preferences of the first user from actions of the first user during one or more previous sessions of playing video content items.

In some embodiments, at least one of the first terminal and the second terminal includes a Set-Top Box.

In some embodiments, at least one of the first terminal and the second terminal includes a smart TV.

According to another aspect of the embodiment of the invention, there is provided a system for customizing a video content item according to personal preferences of at least first and second users, while keeping a common storyline for all customizations of the video content item, the system being functionally associated with a first terminal associated with the first user and a second terminal associated with the second user, the system including:

a. at least one processor in communication with the first terminal and the second terminal;
b. at least one non-transitory computer readable storage medium for instructions execution by the at least one processor, the at least one non-transitory computer readable storage medium having stored:
  i. instructions to obtain first one or more multi-purpose personal preferences of the first user;
  ii. instructions, to be executed subsequent to execution of the instructions to obtain the first one or more multi-purpose personal preferences, to automatically select a first version of the video content item from multiple versions of the video content item, the automatic selection of the first version of the video content item being based on the first one or more multi-purpose personal preferences;
  iii. instructions, to be executed subsequent to the execution of the instructions to automatically select the first version of the video content item, to cause a first playing of the first version of the video content item on a display device associated with the first terminal;
  iv. instructions to obtain second one or more multi-purpose personal preferences of the second user, the second one or more multi-purpose personal preferences being different from the first one or more multi-purpose personal preferences;
  v. instructions, to be executed subsequent to execution of the instructions to obtain the second one or more multi-purpose personal preferences, to automatically select a second version of the video content item from the multiple versions of the video content item, wherein (i) the second version of the video content item is different from the first version of the video content item, (ii) the second version of the video content item is compatible with the first version of the video content item, and (iii) the automatic selection of the second version of the video content item is based on the second one or more multi-purpose personal preferences; and
  vi. instructions, to be executed subsequent to execution of the instruction to automatically select the second version of the video content item, to cause a second playing of the second version of the video content item on a display device associated with the second terminal.

In some embodiments, the second version of the video content item is strictly compatible with the first version of the video content item.

In some embodiments, the second user is different from the first user. In other embodiments, the second user and the first user are the same user.

In some embodiments, the second terminal is different from the first terminal. In other embodiments, the second terminal and the first terminal are the same terminal.

In some embodiments, the instructions to cause the first playing and the instructions to cause the second playing include instructions to cause at least a portion of the first playing and at least a portion of the second playing to occur simultaneously.

In some embodiments:
(i) the first version of the video content item includes a first version of a video scene;
(ii) the second version of the video content item includes a second version of the video scene, such that the first version of the video scene and the second version of the video scene are compatible with each other;
(iii) during a first portion of the first version of the video scene, which first portion includes an occurrence of an event, the first version of the video scene provides a view of an entirety of the event as taken by a first camera; and
(iv) during a second portion of the second version of the video scene, which second portion includes the occurrence of the event, the second version of the video scene provides a view of the entirety of the event as taken by a second camera, different from the first camera.

In some embodiments:
(i) the first version of the video content item includes a first version of a video scene;
(ii) the second version of the video content item includes a second version of the video scene, such that the first version of the video scene and the second version of the video scene are compatible with each other;

(iii) during the first version of the video scene, a specific person is shown for a first accumulated amount of time; and (iv) during the second version of the video scene, the specific person is shown for a second accumulated amount of time, different from the first accumulated amount of time.

In some embodiments:

(i) the first version of the video content item includes a first version of a video scene;

(ii) the second version of the video content item includes a second version of the video scene, such that the first version of the video scene and the second version of the video scene are compatible with each other;

(iii) during the first version of the video scene, the face of a specific person is shown for a first accumulated amount of time; and (iv) during the second version of the video scene, the face of the specific person is shown for a second accumulated amount of time, different from the first accumulated amount of time.

In some embodiments:

(i) the first version of the video content item includes a first version of a video scene;

(ii) the second version of the video content item includes a second version of the video scene, such that the first version of the video scene and the second version of the video scene are compatible with each other;

(iii) during a first portion of the first version of the video scene, which first portion includes an occurrence of an event, the first version of the video scene provides a view of an entirety of the event using a first field of view; and (iv) during a second portion of the second version of the video scene, which second portion includes the occurrence of the event, the second version of the video scene provides a view of the entirety of the event using a second field of view, different from the first field of view.

In some embodiments:

(i) the first version of the video content item includes a first version of a video scene;

(ii) the second version of the video content item includes a second version of the video scene, such that the first version of the video scene and the second version of the video scene are compatible with each other;

(iii) during a first portion of the first version of the video scene, which first portion includes an occurrence of an event, the first version of the video scene provides a view of an entirety of the event as it is seen by a first character participating in the video content item; and (iv) during a second portion of the second version of the video scene, which second portion includes the occurrence of the event, the second version of the video scene provides a view of the entirety of the event as it is seen by a second character participating in the video content item, the second character being different from the first character.

In some embodiments, the multiple versions of the video content item are prepared and stored in advance. In some such embodiments, the at least one processor is associated with a non-volatile storage device storing the multiple versions of the video content item, including the first version of the video content item and the second version of the video content item, the at least one non-transitory computer readable storage medium further having stored:

vii. instructions, to be executed prior to execution of the instructions to cause the first playing, to retrieve the first version of the video content item from the non-volatile storage device; and viii. instructions, to be executed prior to execution of the instructions to cause the second playing, to retrieve the second version of the video content item from the non-volatile storage device.

In some embodiments, the multiple versions of the video content item are not prepared in advance. In some such embodiments, multiple versions of one or more scenes are prepared and stored in advance, and the version of the video content item to be played is assembled prior to starting playing it.

In some of those embodiments, the version of the video content item to be played is assembled prior to starting its playing. In such embodiments, the at least one processor is associated with a non-volatile storage device storing, for at least one specific video scene of the video content item, multiple versions of the specific video scene, the at least one non-transitory computer readable storage medium further having stored:

vii. instructions, to be executed prior to execution of the instructions to cause the first playing, to retrieve from the non-volatile storage device a first version of the specific video scene, the retrieved first version of the specific video scene being included in the first playing of the video content item; and viii. instructions, to be executed prior to execution of the instructions to cause the first playing, to retrieve from the non-volatile storage device a second version of the specific video scene, different from the retrieved first version of the specific video scene, the retrieved second version of the specific video scene being included in the second playing of the video content item.

In other embodiments in which the multiple versions of the video content item are not prepared in advance, the version of the video content item to be played is never assembled, but is constructed dynamically while the video content item is being played. In such embodiments, the at least one processor is associated with a non-volatile storage device storing, for at least one specific video scene of the video content item, multiple versions of the specific video scene, the at least one non-transitory computer readable storage medium further having stored:

vii. instructions to retrieve from the non-volatile storage device, subsequent to starting the first playing of the video content item by the first terminal, a first version of the specific video scene, the retrieved first version of the specific video scene being included in the first playing of the video content item; and viii. instructions to retrieve from the non-volatile storage device, subsequent to starting the second playing of the video content item by the second terminal, a second version of the specific video scene, different from the retrieved first version of the specific video scene, the retrieved second version of the specific video scene being included in the second playing of the video content item.

In some embodiments, the first and second versions of the video content item are taken from two cameras covering the same broadcast program. In some such embodiments:

(i) the instructions to cause the first playing of the video content item and the instructions to cause the second playing of the video content item include instructions to cause real-time broadcasts of a common event, (ii) during a first portion of the first version of the video content item, which first portion includes the common event, the first version of the video content item provides a view of an entirety of the common event as taken by a first camera, and (iii) during a second portion of the second version of the video content item, which second portion includes the occurrence of the common event, the second version of the video content item provides a view of the entirety of the common event as taken by a second camera, different from the first camera.

In some embodiments, the instructions to obtain the first one or more multi-purpose personal preferences of the first user include instructions to receive at least some of the first one or more multi-purpose personal preferences of the first user from an input device manually operated by the first user.

In some embodiments, the instructions to obtain the first one or more multi-purpose personal preferences of the first user include instructions to automatically derive at least some of the one or more multi-purpose personal preferences of the first user from actions of the first user during one or more previous sessions of playing video content items.

In some embodiments, at least one of the first terminal and the second terminal includes a Set-Top Box.

In some embodiments, at least one of the first terminal and the second terminal includes a smart TV.

In some embodiments:
I. the at least one processor includes a central server processor, a first processor associated with the first terminal, and a second processor associated with the second terminal;
II. the at least one non-transitory computer readable storage medium includes:
  A) a central server non-transitory computer readable storage medium for instructions execution by the central server processor, the central server non-transitory computer readable storage medium having stored the instructions to automatically select the first version of the video content item and the instructions to automatically select the second version of the video content item, and further has stored:
    1) instructions to receive from the first processor associated with the first terminal the first one or more multi-purpose personal preferences of the first user;
    2) instructions to transmit to the first processor associated with the first terminal the first version of the video content item;
    3) instructions to receive from the second processor associated with the second terminal the second one or more multi-purpose personal preferences of the second user; and
    4) instructions to transmit to the second processor associated with the second terminal the second version of the video content item;
  B) a first non-transitory computer readable storage medium for instruction execution by the first processor associated with the first terminal, the first non-transitory computer readable storage medium having stored the instructions to obtain the first one or more multi-purpose personal preferences of the first user and the instructions to cause a first playing of the first version of the video content item, and further has stored:
    1) instructions to transmit the first one or more multi-purpose personal preferences of the first user to the central server processor; and
    2) instructions to receive from the central server processor the first version of the video content item; and
  C) a second non-transitory computer readable storage medium for instruction execution by the second processor associated with the second terminal, the second non-transitory computer readable storage medium having stored the instructions to obtain the second one or more multi-purpose personal preferences of the second user and the instructions to cause a second playing of the second version of the video content item, and further has stored:
    1) instructions to transmit the second one or more multi-purpose personal preferences of the second user to the central server processor; and
    2) instructions to receive from the central server processor the second version of the video content item.

Unless otherwise defined, all technical and scientific terms used herein have the same meaning as commonly understood by one of ordinary skill in the art to which the invention pertains. In case of conflict, the specification, including definitions, will take precedence.

As used herein, the terms "comprising", "including", "having" and grammatical variants thereof are to be taken as specifying the stated features, integers, steps or components but do not preclude the addition of one or more additional features, integers, steps, components or groups thereof. These terms encompass the terms "consisting of" and "consisting essentially of".

BRIEF DESCRIPTION OF THE FIGURES

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are used to designate like elements.

In the drawings:

FIGS. 4A, 4B, 4C, and 4D are schematic illustrations of different methods for providing a personalized version of a video content item to a user according to embodiments of the teachings herein;

FIGS. 5A and 5B are schematic block diagrams of embodiments of systems for customizing a video content item according to personal preferences of users, while keeping a common storyline for all customizations of the video content item, according to embodiments of the teachings herein; and FIG. 6 is a flow chart of a method for customizing a video content item according to personal preferences of users, while keeping a common storyline for all customizations of the video content item according to an embodiment of the teachings herein.

DESCRIPTION OF SOME EMBODIMENTS OF THE INVENTION

Figure 1:
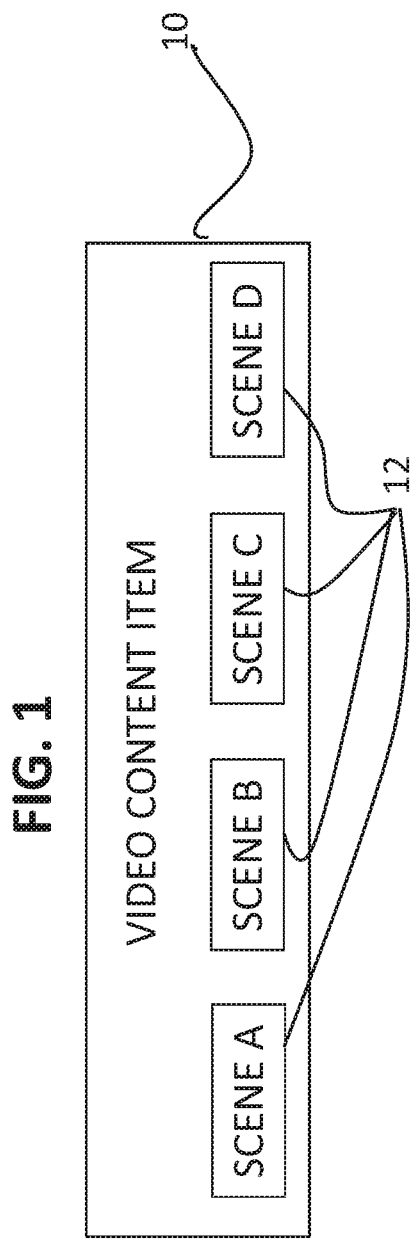
FIG. 1 is a schematic illustration of a video content item including a plurality of video scenes, according to an embodiment of the teachings herein.

It is a goal of the present invention to provide a video content distribution system that provides users with personalized customization of a given video content item. The system provides to different users, having different preferences, different versions of the given video content item that differ from each other in certain characteristics, while keeping the different versions compatible with each other.

The principles, uses and implementations of the teachings herein may be better understood with reference to the accompanying description and figures. Upon perusal of the description and figures present herein, one skilled in the art is able to implement the invention without undue effort or experimentation.

Before explaining at least one embodiment of the invention in detail, it is to be understood that the invention is not limited in its applications to the details of construction and the arrangement of the components and/or methods set forth in the following description and/or illustrated in the drawings and/or the examples. The invention can be implemented with other embodiments and can be practiced or carried out in various ways. It is also understood that the phraseology and terminology employed herein is for descriptive purpose and should not be regarded as limiting.

As seen in FIG. 1, a video content item 10 includes an ordered sequence of one or more video scenes 12 and typically a plurality of video scenes. In the illustrated embodiment, the video content item 10 includes four video scenes—Scene A, Scene B, Scene C, and Scene D. As explained in further detail hereinbelow, the personalized customization of a video content item may include a personalized customization of a single video scene of the video content item or personalized customizations of multiple video scenes of the video content item.

Each video scene is a semantic entity that is a continuous portion of the video content item, and has an independent identity of its own. For example, in a video content item which is a news program, each news item may constitute a scene of the video content item.

The system and method of the teachings herein require that multiple versions of a video content item be compatible with each other, and include compatible versions of the video scenes of the video content item. In some embodiments, the versions of the video content item and/or the versions of the video scenes thereof must be strictly compatible with each other.

As explained in detail hereinbelow in the "Definitions" section, two different versions of the same video scene are considered to be compatible with each other if the facts visible to a user when watching the first version of the video scene and the facts visible to the user when watching the second version of the video scene do not contradict each other, and can be both true at the same time.

This does not mean that the facts shown in the two scenes need to be identical—the facts shown in one version may be different from the facts shown in the other version, provided that there is no contradiction between the facts in the two versions. Additionally, two compatible scenes need not necessarily be of the same length.

Figure 2C:
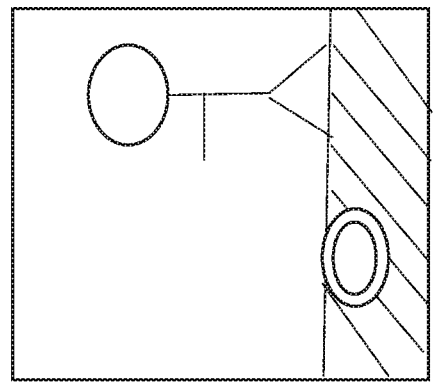
FIGS. 2A, 2B, and 2C are schematic illustrations of different versions of a video scene, some of which are compatible with each other and some of which are incompatible with each other, according to an embodiment of the teachings herein.
Figure 2B:
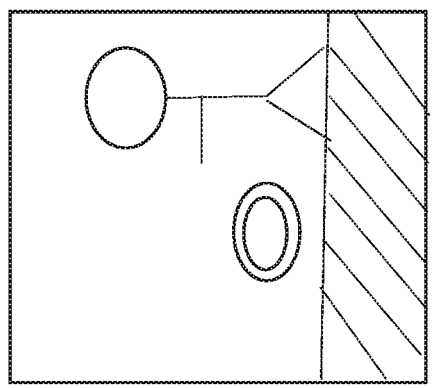
Figure 2A:
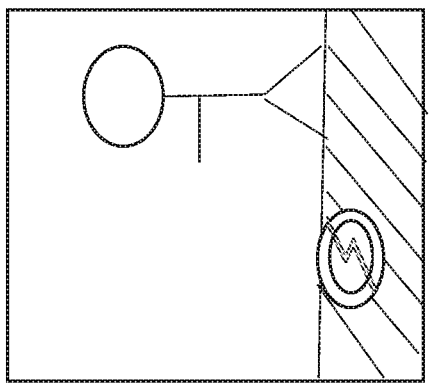

FIGS. 2A, 2B, and 2C show three versions of a video scene, in which a child drops a plate on the floor. The images shown in FIGS. 2A, 2B, and 2C occur a second after the child has let go of the plate.

In the version illustrated in FIG. 2A, the plate has fallen to the floor, and is broken. In the version illustrated in FIG. 2B, the plate is in the air, in the process of falling. The versions of FIGS. 2A and 2B are compatible, since they show the same situation of the plate being dropped, and it is possible that the plate shown in FIG. 2B will reach the floor and break.

The version of the scene illustrated in FIG. 2C shows the plate having reached the floor, and still being whole. The version of FIG. 2C is incompatible with the version of FIG. 2A, since the two versions contradict each other—the plate cannot be whole (as shown in FIG. 2C) and broken (as seen in FIG. 2A), simultaneously. However, the version of FIG. 2C is compatible with the version of FIG. 2B, since it is possible that the plate shown in FIG. 2B will reach the floor and remain whole.

As another example, if the video scene is a conversation between two people, and in a first version of the scene the face of a one of the two characters is shown most of the time, while in a second version of that scene the face of the other character is shown most of the time, then the two versions are compatible, provided that the words spoken during the conversation are the same in both versions. However, if the spoken words are not the same in the two versions, then the two versions are incompatible, even if both show the face of the same character at all time.

In order for compatibility of two versions of a video scene to be meaningful, the two versions being compared should correspond to a common storyline and should relate to one or more common facts within the common storyline. If the two versions correspond to different and non-related storylines or do not relate to at least one common fact within the common storyline, then it is meaningless to speak about their compatibility.

For example, if one version of a video scene shows a person knocking on a house door, with the video taken from a camera placed in the street, and the other version shows another person walking towards the door to open it in response to the knock being heard, with the video taken from a camera located inside the house, then the two versions of the scene are compatible. This is because the two versions relate to a common fact—the knock at the door—and do not contradict each other. In this example, the two versions are compatible even though they do not share any image, since the two cameras are in different locations.

On the other hand, if one version of a video scene shows a man sitting in his car in front of a house, and another version shows a woman inside the house dressing for going out on a date, the two versions do not share any common fact of the storyline—the two versions may be shifted in time relative to each other without creating any contradiction. Consequently, these two versions are neither compatible nor incompatible. In this example it is possible that the two versions correspond to a common storyline (the woman may be dressing for going out for a date with the man sitting in the car), but the lack of a common fact makes their compatibility meaningless.

If, however, the man is shown talking on the phone while sitting in the car and saying that he is currently in front of his girlfriend's house and is waiting for her to dress up for their date and come out, then the two versions do share a common fact of the storyline—the fact that the woman is currently dressing for going out for a date with the man in the car, and consequently the two versions are compatible. The two versions would be compatible even if one would not see that the man's car is in front of the same house in which the woman is getting dressed, because the two versions share the common fact of the woman getting dressed for the date regardless of physical location. Two compatible versions of a video scene are strictly compatible with each other if they include one or more common facts of the common storyline that explicitly appear in visual images of each of the two versions.

Returning to the example of a person knocking on the door, if one version of the video scene shows a person knocking on a house door, with the video taken from a camera placed in the street, and the other version shows another person walking towards the door to open it in response to the knock being heard, with the video taken from a camera located inside the house, and the knock at the door is the only fact common to the two versions, then the two versions of the scene are not strictly compatible.

Similarly, in the example of the man waiting for his date to be ready, if one version of the video scene shows a man sitting in his car in front of a house, talking on the phone and saying that he is currently in front of his girlfriend's house and is waiting for her to dress up for their date and come out, and another version shows a woman inside the house dressing for going out for a date, and there are no common facts visible in the visual images of the two versions, then the two versions of the scene are not strictly compatible.

However, if one version of a video scene shows a game of tennis with the video taken from a camera placed high above the game court, and the other version shows the same game of tennis with the video taken from a camera placed behind one of the two players, and there is no contradiction between the two versions, then the two versions of the scene are strictly compatible, even though not a single fact of the scene is shown from the same direction in both versions.

Roughly speaking, two versions of a video content item are compatible with each other if and only if they follow a common plot and can both be true at the same time. In other words, two different versions of the same video content item are compatible with each other if and only if (i) the plots of the two versions do not contradict each other, and (ii) the two versions include the same group of video scenes, appearing in exactly the same order.

The "not contradict" requirement implies that two versions of the same video content item having two different and contradicting endings (e.g. one in which the hero dies and one in which the hero survives) cannot be compatible with each other.

The "same scenes" requirement implies that two versions of the same video content item in which one version omits a scene appearing in the other version are not compatible with each other. Similarly, two versions of the same video content item having the same scenes, where the scenes are ordered in a first order in one of the versions and in a different order in the other version, are also not compatible with each other.

More precisely, two versions of a video content item are compatible with each other if and only if the two versions include the exact same sequence of video scenes, and for each given video scene included in the two versions, either (i) a common version of the given video scene appears in both versions of the video content item, or (ii) different versions of the given video scene appear in the two versions of the video content item, and the two different versions of the given video scene are compatible with each other.

FIGS. 3A, 3B, 3C, 3D, 3E, and 3F schematically show multiple versions of a video content item. The version shown in FIG. 3A includes a sequence of five scenes, namely Scene A, Scene B, Scene C, Scene D, Scene E. The version shown in FIG. 3B includes a different sequence of the same five scenes, namely Scene A, Scene B, Scene C, Scene E, Scene D. The version show in FIG. 3C includes a sequence of four scenes, namely Scene A, Scene B, Scene D, Scene E. The version shown in FIG. 3D includes a sequence of five scenes, namely Scene A, Scene B, Scene C, Scene D, Scene F. The version shown in FIG. 3E includes a sequence of five scenes, namely Scene A, Scene B, Scene C, Scene D, Scene E*. The version shown in FIG. 3F includes a sequence five scenes, namely Scene A, Scene B, Scene C, Scene D, Scene Ê.

Scene E includes three versions—E, E*, and Ê. Scenes E and E* are assumed to be incompatible with each other, as demonstrated by the dashed edge of scene E* in FIG. 3E, while scenes E and Ê are assumed to be compatible with each other.

Figure 3A:
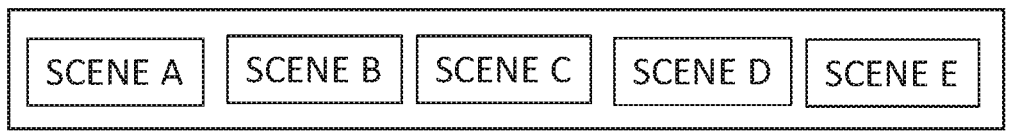
FIGS. 3A, 3B, 3C, 3D, 3E, and 3F are schematic illustrations of different versions of a video content item, some of which are compatible with each other and some of which are incompatible with each other, according to an embodiment of the teachings herein.
Figure 3B:
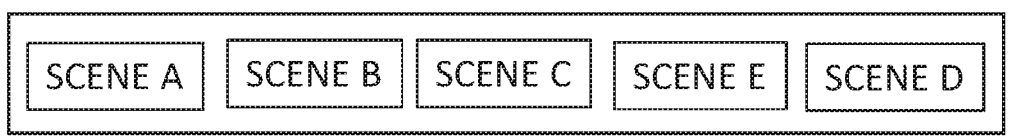

According to the explanation of compatibility of video content items provided hereinabove, the version of FIG. 3A is incompatible with the version of FIG. 3B. While the two versions of FIGS. 3A and 3B include the same group of video scenes, these video scenes are in a different order in the two versions, and as such the two versions of the video content item do not include the same sequence of video scenes, and are not compatible.

Figure 3C:

The version of FIG. 3C is also not compatible with the version of FIG. 3A, because the two versions do not include the exact same sequence of video scenes, because the version of FIG. 3A includes Scene C, and the version of FIG. 3C skips Scene C.

Figure 3D:
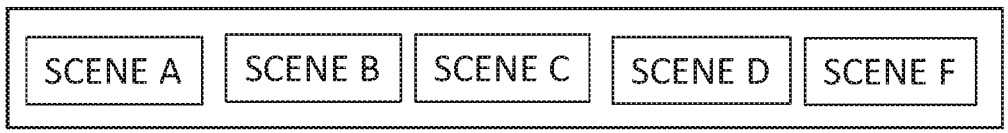
Figure 3E:
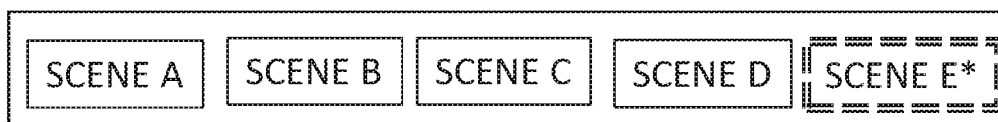

Even though the version of FIG. 3A and the version of FIG. 3E include the same sequence of scenes (Scene A, Scene B, Scene C, Scene D, and a version of Scene E), they are not compatible with each other. This is because, as assumed above, the version Scene E* is incompatible with the version Scene E, and as such the two versions of the video content item do not meet the compatibility requirement defined above.

Figure 3F:
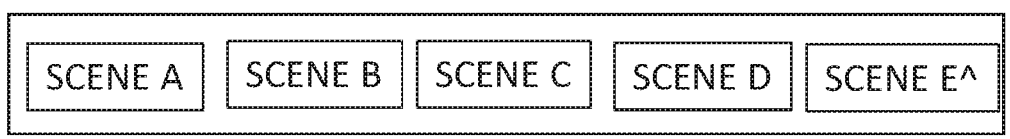

However, the version of FIG. 3A and the version of FIG. 3F, which include the same sequence of scenes (Scene A, Scene B, Scene C, Scene D, and a version of Scene E), are compatible, because, as assumed above, the version Scene Ê is compatible with the version Scene E.

As a result of the definition of compatibility between different versions of video scenes as explained above, in order for the term "compatible versions of a video content item" to be meaningful, the two versions of the video content item being compared should include only pairs of corresponding scenes that are either identical or are two different versions of the same scene for which compatibility is meaningful (i.e. the two versions of the video scene share a common storyline and at least one common fact within the common storyline).

If at least one pair of corresponding scenes of the two versions of the video content item does not meet that requirement (i.e. the two versions of the video scene correspond to different and non-related storylines or do not relate to at least one common fact within the common storyline), then it is meaningless to speak about the compatibility of the two versions of the video content item, as their corresponding video scenes are neither compatible nor incompatible. In such case the two versions of the video content item being compared are also neither compatible nor incompatible.

For example, the version of FIG. 3D does not include corresponding scenes to those of the version of FIG. 3A—the version of FIG. 3A includes Scene E, and the version of FIG. 3D includes, in the corresponding location in the sequence of scenes, Scene F, which is different from Scene E. As such, the versions of FIGS. 3A and 3D are neither compatible nor incompatible—the definition of compatibility does not apply to these two versions.

In accordance with the present invention, multiple different and compatible versions of a given video content item may be provided in various ways.

Figure 4A:
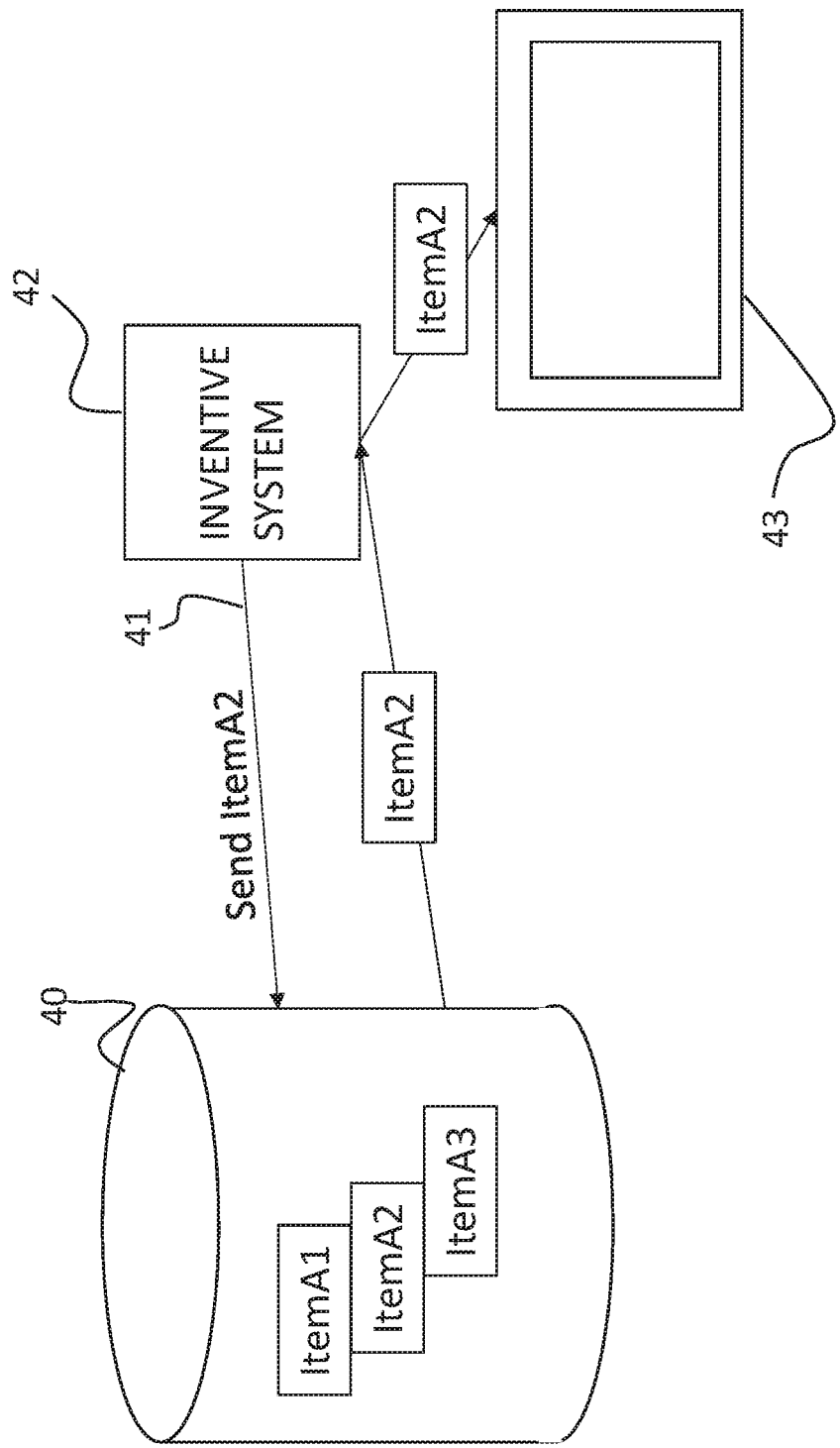

In a first method, illustrated in FIG. 4A, multiple compatible versions of the complete video content item are prepared in advance to playing the video content item to users, and may be stored in a suitable memory component. In the illustrated embodiment, versions ItemA1, ItemA2, and ItemA3, all of which are compatible with each other, are prepared in advance and stored in a database 40.

Typically, the multiple compatible versions will be prepared at the time of creation of the video content item. For example, when shooting a movie requiring multiple points of view in a specific scene, multiple versions of the complete movie are prepared, the multiple versions differing only in the point-of-view of the specific scene.

When a specific user initiates playing of the movie, his preferences are obtained, and the version of the complete movie that best matches the specific user's preferences is selected to be played and is retrieved from storage. This method is illustrated in FIG. 4A as a selection signal 41 provided from a system 42 according to the invention, which has obtained the user's preferences, to the database 40, and a transmission of version ItemA2 from the database 40 to the system 42, and from there to a smart television 43.

Figure 4B:
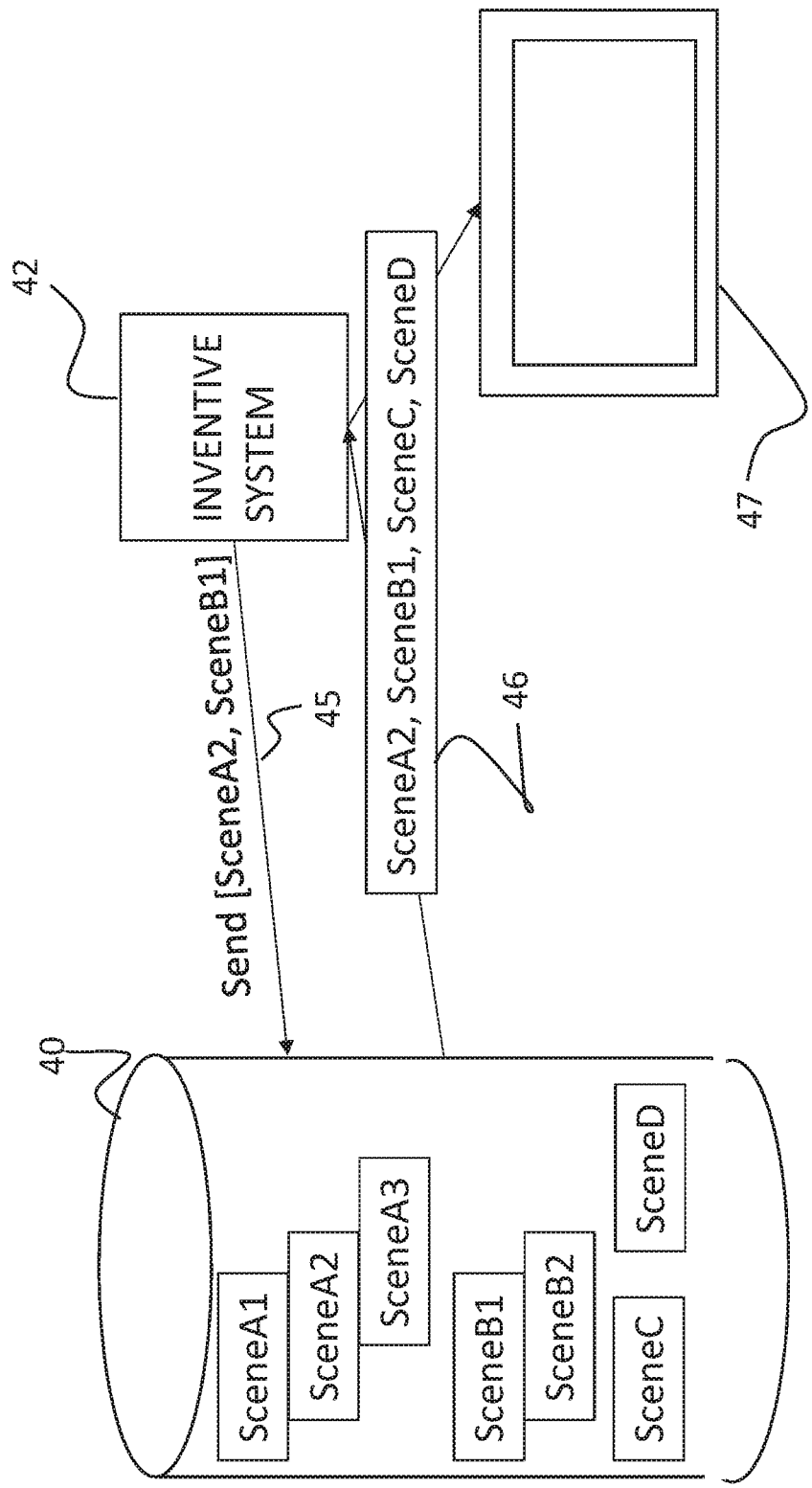

In a second method, illustrated in FIG. 4B, multiple compatible versions of each scene requiring multiple versions are separately prepared, in advance to playing the video content item to users. Only one version is prepared for scenes which do not require variation. The prepared scenes may be stored in a suitable memory component. In the illustrated embodiment, multiple versions are created for Scene A—SceneA1, SceneA2, SceneA3, and for Scene B—SceneB1, SceneB2. Only one version is created for Scenes C and D. All the versions of the scenes are prepared in advance and are stored in database 40.

Typically, the multiple compatible versions of relevant scenes will be prepared at the time of creation of the video content. For example, when shooting a movie requiring multiple points of view in a first specific scene and requiring multiple zoom states in a second specific scene, multiple versions of the first and second specific scenes (but not of any other scene) are prepared when shooting the movie. The multiple versions of the first scene differ only in their point-of view and the multiple versions of the second scene differ only in their zoom state.

When a specific user initiates playing of the movie, his preferences are obtained. For each scene having multiple versions, the version of the scene that best matches the specific user's preferences is selected. A version of the complete movie, customized to the specific user's preferences, is then assembled. The assembled version includes the selected version of each scene having multiple versions, and the single version of each scene not having multiple versions. The constructed version of the movie is then played to the specific user. This method is illustrated in FIG. 4B by a selection signal 45 including a sequence of selected versions of scenes. The selection signal 45 is sent from system 42, which has obtained the user's preferences, to database 40. Subsequently database 40 transmits a video content item 46, including the sequence of selected versions of scenes, to system 42, and from there to a smart television 47.

In a third method, illustrated in FIG. 4C, multiple versions for specific scenes are prepared and stored in database 40 as in the second method. However, because the selection of a specific version of a given scene only affects what the user sees when that scene starts playing, the selection is carried out while the movie is playing, and not when starting to play the movie, with the exception of the opening scene, if it has multiple versions.

More specifically, when starting playing the movie, scenes not having multiple versions are played without referring to the specific user's preferences. Only when reaching a scene having multiple versions, the specific user's preferences are consulted in order to select the version of the scene which best matches the preferences. A separate selection (based on the preferences) is carried out for each scene having multiple versions, right before that scene is to be played. Thus, no complete version of the movie is ever constructed—all selections of scenes are carried out on-the-fly while the movie is being played. This method is illustrated in FIG. 4C by a plurality of signals 48*a*, 48*b*, 48*c*, and 48*d*, providing selections for scene A, scene B, scene C, and scene D, respectively. The signals are each separately sent from system 42, which has obtained the user's preferences, to database 40, and in response to each such signal database 40 sends the corresponding selected scene to system 42, and from there to smart television 49, for playing thereof. It is appreciated that for Scene C and Scene D, which do not include multiple versions, the signals 48*c* and 48*d* may be default signals, just indicating that those scenes are now required for playing.

A fourth method, illustrated in FIG. 4D, is used when none of the previous methods is available, for example when the video content item is a real-time broadcast, as in real-time broadcasts there is no possibility of preparing multiple versions in advance.

For such items, the present invention employs multiple cameras operating in parallel. In FIG. 4D, this is illustrated as multiple cameras 50*a*, 50*b*, and 50*c* filming a conversation between two people, the cameras 50*a*, 50*b*, and 50*c* being in communication with a video distribution system 54 according to the present invention. The preferences of a specific user are obtained by the video distribution system 54 as in the previous methods, and they are used in real-time for automatically selecting the camera whose view best matches the user preferences. For example, if the user preferences indicate that the user prefers zooming in on faces, then when detecting, in real-time, that multiple cameras are simultaneously directed at a person and a specific one of the cameras is showing a close-up of the person's face, the video distribution system 54 automatically provides to the specific user the video originating from that specific camera. The automatic transmission of video originating from the specific camera, here illustrated as camera 50*c*, from the video distribution system to the user's terminal 56 is indicated in FIG. 4D by signal 58*c*.

The user's preferences, to be used in any of the previous examples, may be obtained using any one of the methods disclosed below, or a combination thereof:

A. Asking the user to manually and explicitly provide his personal preferences. For example, the user's terminal may display, either upon user request or upon first activation of the user's terminal, a "preferences" screen. The preferences screen may contain multiple GUI elements, each dedicated to a certain type of preference. The user may interact with one or more of the GUI elements, thereby to provide to the system information about his preferences.

One GUI element may be used to define the user's desired state of zoom on facial features. The GUI element may include radio buttons for "zoom-in", "zoom-out" and "default" (or "don't care"). If the user selects the "default" setting, when watching video content items, the user is presented with the view selected by the director.

Another GUI element may be used to define the user's desired point-of-view when watching tennis games. The GUI element may include a first portion which is a drop-down list containing the alternatives "switch between players", "face favored player", "look from the side", "look from above" and "default" (or "don't care"). The GUI element may further include a second portion for inputting a list of names of one or more favored tennis players. The names may be selected from a pre-defined list of well-known tennis players or may be manually input by the user using an input interface, such as a keyboard, touchscreen, or touchpad. In some cases, the user may be able to define the order of players in the list of favored players. When a match is played between two players appearing in the list, the one higher in the list is considered to be the favored player, and if the user has selected the "face favored player" option, the view presented to the user will be the one facing the favored player. If neither of the two players playing the game is in the list of players favored by the user, the "face favored player" selection has no effect and the default view is displayed.

Another GUI element may be used to define the desired point-of-view when watching a soccer game. The GUI element may include a first portion which is a drop-down list containing the alternatives "look from field center", "look from behind first goal", "look from behind second goal", "look from above" and "default" (or "don't care"). The GUI element may include a second portion allowing the selection of a desired zoom state, for example between "zoom-in", "zoom-out", and "alternate between zoom states". Assuming that the referee has a WiFi-connected wearable camera, the list of point-of-view alternatives may also include a "follow referee" option. Additionally, assuming some or all of the players have WiFi-connected wearable cameras, the list of point-of-view alternatives may also include "follow goalkeeper of team X" (e.g. "follow goalkeeper of Manchester United"), "follow left defender of team Y" (e.g. "follow left defender of Ajax Amsterdam"), "follow player Z" (e.g. "follow Ronaldo"), etc. The GUI element may also include a third portion for inputting a list of names of one or more favored soccer players. The names may be selected from a pre-defined list of well-known soccer players or may be manually input by the user using an input interface, such as a keyboard, touchscreen, or touchpad. When a list of favored players is included, the list of point-of-view alternatives may include the option of "follow favored player", that, when selected, causes the displayed content to be taken from a camera being worn by the player who is highest in the list of favored soccer players and has a wearable camera (if such a player exists).

Other similar GUI elements may be used for other types of scenes, for example for face-to-face conversation scenes, for scenes in which events are watched by multiple actors, and the like.

B. Automatically extracting at least some user preferences from past behavior of the user. The user's interaction with the video content distribution system is monitored and analyzed, to derive insights regarding the user's preferences under various circumstances. When using automatic extraction of preferences, the system will typically include sensors that report the user's activities.

For example, an image sensor, for instance in the form of a video camera, may be installed on top of the screen, the image sensor including an eye movement tracker. When the user watches a face-to-face conversation scene between two famous actors (e.g. Julia Roberts and Richard Gere), the system determines the percentage of time the user is focusing on the face of each actor (out of the total time this actor's face is shown on the screen during the conversation). If the percentage for a certain actor is above a pre-defined threshold value, it is concluded that the user has an interest in the certain actor and that certain actor is automatically added to the favored actors list. The percentage of time determined for each actor in the list serves for ordering the list according to "level of favoring". When, at a later time, a "favored actor" is detected in a conversation with a "less favored actor" (e.g. in another content item watched by that user), more screen time is allocated to showing the "more favored actor" than to the "less favored actor".

As another example, a sound sensor, for instance in the form of a microphone, may be installed in or near the screen. When the user watches a sports game between two players or two teams, the sound sensor captures the user's exclamations and cheers, and the system detects, from the captured audio, which team or player is favored by the user. For example, if the user is watching an NBA game between the Golden State Warriors and the Chicago Bulls, and the sound sensor captures the cheer "Yeah! Go Warriors !" each time the Warriors score a basket, and the exclamation "no, not again!" each time the Bulls score a basket, the system concludes that the user favors the Golden State Warriors over the Chicago Bulls, and the Golden State Warriors is automatically added to the favored teams list. When, at a later time, the user watches a game between a "favored team" and a "less favored team", more screen time is allocated to showing the "more favored team" than to the "less favored team".

As yet another example, the system may use the user's watching history to determine the user's preferences. For example, when analyzing the user's watching history, the system may identify that the user watches 90% of tennis games in which Nadal plays, but only 50% of tennis games in which Federer plays. The system may conclude from this watching history that the user favors Nadal over Federer, and Nadal is automatically added to the favored players list, higher than Federer (if Federer is already in the favored players list). When, at a later time, the user watches a tennis game between Nadal and Federer, more screen time is allocated to showing Nadal than to showing Federer.

Other methods for automatically extracting preferences of a user from his or her history of watching video content are well known in the art, and each such method may be used in the context of the present invention.

Figure 5B:
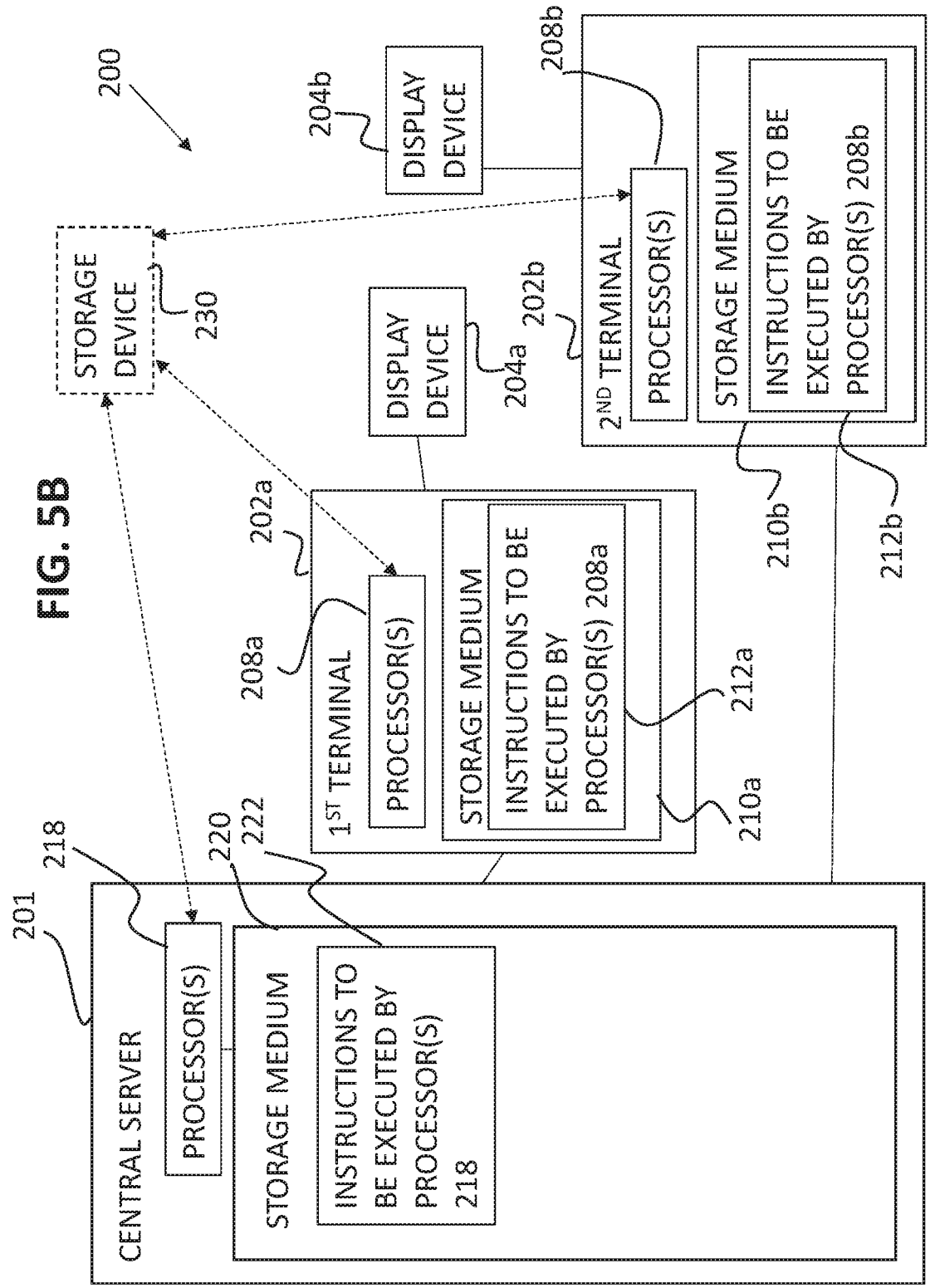

Reference is now made to FIGS. 5A and 5B, which are schematic block diagrams of embodiments of systems for customizing a video content item according to personal preferences of users, while keeping a common storyline for all customizations of the video content item, according to embodiments of the teachings herein.

As seen in FIG. 5A, a system 100 for customizing a video content item according to personal preferences of multiple users is functionally associated with multiple terminals 102, each terminal 102 associated with one of the multiple users. The customized versions of the video content item have a common storyline, and are compatible with each other.

System 100 is a server based system, such that the instructions for carrying out the inventive methods described herein are stored in system 100, and when implementing the method, these instructions are carried out by the processor(s) of the system 100, as opposed to some instructions being stored in and/or implemented by terminals 102.

For the sake of clarity, the description hereinbelow relates to a first user associated with a first terminal and a second user associated with a second terminal. However, the description is equally applicable to any number of users and associated terminals.

Additionally, for the sake of clarity, the description below relates to a single video content item. However, the description and the present invention are equally applicable to multiple video content items.

Each of terminals 102 may be any suitable type of terminal, including, for example, a Set-Top Box and a smart TV. Each terminal 102 is functionally associated with a display device 104, such as a display screen. In some embodiments, the display device 104 may form part of the terminal 102, such as, for example, in a smart TV.

System 100 includes one or more processor 108 and a storage medium 110, which is typically a non-transitory computer readable storage medium.

The storage medium 110 includes instructions to be executed by the one or more processors 108, in order to carry out various steps of the method described herein below with respect to FIG. 6. Specifically, the storage medium includes the following instructions:

instructions 112, that when executed by the one or more processors 108, obtain one or more multi-purpose personal preferences of the first user;

instructions 114, that when executed by the one or more processors 108, automatically select a first version of the video content item from multiple versions of the video content item, the selection being based on some or all of the obtained multi-purpose personal preferences of the first user;

instructions 116, that when executed by the one or more processors 108, cause the display device associated with the first terminal to play the first version of the video content item;

instructions 122, that when executed by the one or more processors 108, obtain one or more multi-purpose personal preferences of the second user;

instructions 124, that when executed by the one or more processors 108, automatically select a second version of the video content item from the multiple versions of the video content item; the second version of the video content item is different from the first version and compatible therewith; the selection of the second version is based on some or all of the obtained multi-purpose personal preferences of the second user; and instructions 126, that when executed by the one or more processors 108, cause the display device associated with the second terminal to play the second version of the video content item.

Multi-purpose personal preferences of a user, as obtained when executing the instructions 112, are personal preferences of the user, whose use may lead to making different selections at different times. For example, the personal preference "prefers comedies" may cause a selection of the movie "Borat" in a first event, a selection of some episode of the TV series "Friends" in a second event, and a selection of a comic version of a given video scene from multiple versions of the given video scene in a third event. Similarly, the personal preference "prefers Angelina Jolie" may cause a selection of the movie "Mr. and Mrs. Smith" in a first event, a selection of the movie "Original Sin" in a second event, and for a given video scene in which Angelina Jolie appears, a selection of a version of the given video scene in which Angelina's face is shown on the screen during most of the scene in a third event. By contrast, the preference "prefers Gone with the Wind" can only result in selecting the movie "Gone with the Wind" and nothing else, and therefore is not a multi-purpose personal preference.

The one or more processors 108 execute the instructions 114 only following execution of instructions 112, and executes instructions 116 only following execution of instructions 114. Similarly, the one or more processors 108 execute the instructions 124 only following execution of instructions 122, and executes instructions 126 only following execution of instructions 124.

In some embodiments, the instructions 124, are instructions that, when executed by the one or more processors 108, automatically select a second version of the video content item that is strictly compatible with the first version of the video content item.

In some embodiments, the first and second users are different users. In other embodiments, the first and second users are the same user, for example at different points in time.

In some embodiments, the first and second terminals 102 are different terminals. In other embodiments, the first and second terminals 102 are the same single terminal, such that instructions 116 cause playing of the first version of the video content item on the single terminal, and instructions 126 cause playing of the second version of the video content item on the single terminal.

In some embodiments, instructions 116 to cause the playing of the first version of the video content item and instructions 126 to cause the playing of the second version of the video content item comprise instructions to cause at least a portion of playing of the first version and at least a portion of the playing of the second version to occur simultaneously. Stated differently, in some embodiments, instructions 116 and instructions 126 are carried out at least partially concurrently, such that at least part of the first version and part of the second version of the video content item are played at the same time.

In some embodiments, the first version of the video content item, selected by processor(s) 108 executing instructions 114, includes a first version of a video scene, and the second version of the video content item, selected by processor(s) 108 executing instructions 124, includes a second version of the video scene, where the first version of the video scene and the second version of the video scene are compatible with each other.

In some embodiments including two such compatible versions of a video scene, a first portion of the first version of the video scene and a second portion of the second version of the video scene both include the occurrence of an event. However, the first version of the video scene provides a view of an entirety of the event, as taken by a first camera, while the second version of the video scene provides a view of the entirety of the event as taken by a second camera, different from the first camera.

For example, the event may be the scoring of a goal in a soccer game, beginning at the time when the scoring team started the play that ended in scoring the goal, and terminating at the point the ball hit the net. In the first version of the scene, the camera is located above the goal, and shows the play as the ball is being kicked toward the goal and flies into the net, and in the second version of the scene the camera is worn by the referee, and provides a view of the play from behind the players as they are approaching the goal.

In some embodiments including two such compatible versions of a video scene, a specific person is shown for a first accumulated amount of time during the first version of the video scene, and is shown for a second accumulated amount of time during the second version of the video scene, where the second accumulated amount of time is different from the first accumulated amount of time.

In some embodiments including two such compatible versions of a video scene, the face of a specific person is shown for a first accumulated amount of time during the first version of the video scene, and is shown for a second accumulated amount of time during the second version of the video scene, where the second accumulated amount of time is different from the first accumulated amount of time.

For example, in a scene showing Oprah Winfrey interviewing Hillary Clinton, one version of the scene always shows the facial expressions of Hillary Clinton, whereas a second version of the same interview switches between showing the face of Oprah Winfrey and the face of Hillary Clinton depending on which of the two women is talking at the time. As such, the first version of the scene shows Hillary Clinton for a greater accumulated period of time than the second version.

In some embodiments including two such compatible versions of a video scene, a first portion of the first version of the video scene and a second portion of the second version of the video scene both include the occurrence of an event. However, the first version of the video scene provides a view of an entirety of the event using a first field of view, while the second version of the video scene provides a view of the entirety of the event using a second field of view, different from the first field of view.

For example, in a scene showing an argument between a husband and his wife, the event is defined from the time the husband comes home and is confronted by his wife, to the time when they both walk away from each other in a huff. In a first version of the scene, the whole argument is seen by showing only the faces of the two people speaking, and focusing on their facial expressions. In a second version of the scene, the whole argument is seen from a larger field of view, such that the body language of the people arguing is visible.

In some embodiments including two such compatible versions of a video scene, a first portion of the first version of the video scene and a second portion of the second version of the video scene both include the occurrence of an event. However, the first version of the video scene provides a view of an entirety of the event as it is seen by a first character participating in the video content item, while the second version of the video scene provides a view of the entirety of the event as it is seen by a second character participating in the video content item, where the second character is different from the first character.

For example, consider a scene which includes the mugging of a person (the event in this example), with two observers watching the mugging—the first observer watching the mugging from the window of his/her house and seeing the back of the mugger and the face of the person being mugged, and the second observer watching the mugging from behind a tree and seeing the face of the mugger and the back of the person being mugged. A first version of the scene provides the view of the first observer, who is looking out of his window. As such, the first version of the scene does not show the face of the attacker. A second version of the scene provides the view of the second observer, who is hiding behind the tree. As such, the second version of the scene shows the face of the attacker but does not show the face of the person being attacked.

In some embodiments, processor(s) 108 are associated with a non-volatile storage device 130. In some embodiments storage device 130 may form part of system 100, whereas in other embodiments storage device 130 may be remote from system 130, while still being accessible to processor(s) 108, for example using a suitable communication mechanism such as a transceiver.

In some embodiments, storage device 130 has stored multiple versions of the video content item, including the first version selected by processor(s) 108 when executing instructions 114 and the second version selected by processor(s) 108 when executing instructions 124, for example as illustrated in FIG. 4A. In some such embodiments, non-transitory computer readable storage medium 110 additionally has stored:

instructions 132a, that when executed by the one or more processors 108, retrieve the first version of the video content item from non-volatile storage device 130; and instructions 132b, that when executed by the one or more processors 108, retrieve the second version of the video content item from non-volatile storage device 130.

In such embodiments, instructions 132a are executed by processor(s) 108 following execution of instructions 114 in which the first version of the video content item is selected, and prior to execution of instructions 116 which cause playing of the first version of the video content item. Similarly, instructions 132b are executed by processor(s) 108 following execution of instructions 124 in which the second version of the video content item is selected, and prior to execution of instructions 126 which cause playing of the second version of the video content item.

In some embodiments, storage device 130 has stored, for at least one specific video scene of the video content item, multiple versions of the specific video scene, for example as illustrated in FIGS. 4B and 4C.

In some such embodiments, in which multiple versions of the specific video scene are stored in storage device 130, non-transitory computer readable storage medium 110 additionally has stored:

instructions 134a, that when executed by the one or more processors 108, retrieve from non-volatile storage device 130 the first version of the specific scene, which first version of the specific scene is included in the first version of the video content item; and instructions 134b, that when executed by the one or more processors 108, retrieve from non-volatile storage device 130 the second version of the specific scene, which second version of the specific scene is included in the second version of the video content item.

In such embodiments, instructions 134a are executed by processor(s) 108 following execution of instructions 114 in which the first version of the video content item is selected, and prior to execution of instructions 116 which cause playing of the first version of the video content item. Similarly, instructions 134b are executed by processor(s) 108 following execution of instructions 124 in which the second version of the video content item is selected, and prior to execution of instructions 126 which cause playing of the second version of the video content item.

A schematic structure of a system that that uses the instructions 134a and 134b is illustrated in FIG. 4B.

In other such embodiments, in which multiple versions of the specific video scene are stored in storage device 130, the first and second versions of the video content item are dynamically created during playing thereof, as illustrated in FIG. 4C. In such embodiments, non-transitory computer readable storage medium 110 additionally has stored:

instructions 136a, that when executed by the one or more processors 108 after the first terminal 102 has started to play the first version of the video content item, retrieve from non-volatile storage device 130 the first version of the specific scene, which first version of the specific scene is included in the first version of the video content item; and instructions 136b, that when executed by the one or more processors 108 after the second terminal 102 has started to play the second version of the video content item, retrieve from non-volatile storage device 130 the second version of the specific scene, which second version of the specific scene is included in the second version of the video content item.

In some embodiments, which are schematically illustrated in FIG. 4D, instructions 116 and instructions 126 include instructions that, when executed by the one or more processors 108, cause the first and second terminals to play real-time broadcasts of a common program. In some such embodiments a first portion of the first version of the video content item and a second portion of the second version of the video content both include a common event. However, the first version of the video content item provides a view of an entirety of the common event, as taken by a first camera, while the second version of the video content item provides a view of the entirety of the common event as taken by a second camera, different from the first camera.

In some embodiments, instructions 112 which when executed by processor(s) 108 obtain the multi-purpose preferences of the first user, include instructions to receive at least some of the multi-purpose preferences from an input device manually operated by the first user.

In some embodiments, instructions 112 which when executed by processor(s) 108 obtain the multi-purpose preferences of the first user, include instructions to automatically derive at least some of the one or more multi-purpose personal preferences of the first user from actions of the first user during one or more previous sessions of playing video content items.

Turning now to FIG. 5B, a system 200 for customizing a video content item according to personal preferences of multiple users includes a central server 201 functionally associated with multiple terminals, illustrated in FIG. 5B as terminals 202a and 202b, such that each terminal is associated with one of the multiple users. The customized versions of the video content item generated by system 200 for the multiple users all have a common storyline, and are compatible with each other.

System 200 is a distributed system, such that the instructions for carrying out the inventive methods described herein are distributed between memory components of central server 201 and of terminals 202a and 202b, and when implementing the method, some instructions are carried out by the processor(s) of the central server 201, while other instructions are carried out by the processor(s) of terminals 202a and 202b.

For the sake of clarity, the description hereinbelow relates to a first user associated with a first terminal and a second user associated with a second terminal. However, the description is equally applicable to any number of users and associated terminals.

Additionally, for the sake of clarity, the description below relates to a single video content item. However, the description and the present invention are equally applicable to multiple video content items.

Each of terminals 202a and 202b may be any suitable type of terminal, including, for example, a Set-Top Box and a smart TV. Each of terminals 202a and 202b is functionally associated with a display device 204, such as a display screen. In some embodiments, the display device 204 may form part of the terminal, such as, for example, in a smart TV.

Terminal 202a includes one or more processor 208a and a storage medium 210a, which is typically a non-transitory computer readable storage medium. Similarly, terminal 202b includes one or more processor 208b and a storage medium 210b, which is typically a non-transitory computer readable storage medium. In embodiments that include more than two terminals, each terminal includes one or more processors and a storage medium.

Additionally, central server 201 includes one or more processor 218 and a storage medium 220, which is typically a non-transitory computer readable storage medium.

Each storage medium includes instructions to be executed by the one or more corresponding processors, in order to carry out various steps of the method described herein below with respect to FIG. 6. As such, storage medium 210a has stored a first set of instructions 212a, for execution by processor(s) 208a, storage medium 210b has stored a second set of instructions 212b, for execution by processor(s) 208b, and storage medium 220 has stored a third set of instructions 222, for execution by processor(s) 218.

Each of the following instructions is stored on at least one of storage mediums 210a, 210b, and 220:

instructions (similar to instructions 112 of FIG. 5A), that when executed by a processor, obtain one or more multi-purpose personal preferences of the first user;

instructions (similar to instructions 114 of FIG. 5A), that when executed by a processor, automatically select a first version of the video content item from multiple versions of the video content item, the selection being based on some or all of the obtained multi-purpose personal preferences of the first user;

instructions (similar to instructions 116 of FIG. 5A), that when executed by a processor, cause the display device associated with the first terminal to play the first version of the video content item;

instructions (similar to instructions 122 of FIG. 5A), that when executed by a processor, obtain one or more multi-purpose personal preferences of the second user;

instructions (similar to instructions 124 of FIG. 5A) that when executed by a processor, automatically select a second version of the video content item from the multiple versions of the video content item; the second version of the video content item is different from the first version and compatible therewith; the selection of the second version is based on some or all of the obtained multi-purpose personal preferences of the second user; and instructions (similar to instructions 126 of FIG. 5A), that when executed by a processor, cause the display device associated with the second terminal to play the second version of the video content item.

The order in which the instructions are executed by processors 208a, 208b, and/or 218, is as described hereinabove with respect to FIG. 5A. Additionally, various characteristics of the instructions, the users, the terminals, and the selected first and second versions, are as described in detail hereinabove with respect to FIG. 5A.

The distribution of the instructions between the instruction sets 212a, 212b, and 222 may vary between embodiments of the invention. Depending on the specific distribution of instructions, additional instructions may be stored in the instruction sets 212a, 212b, and/or 222.

For example, in one embodiment, the terminals 202a and 202b may be the ones who obtain corresponding user preferences and cause the corresponding display devices to play the selected versions of the video content item, whereas the central server 201 is the one to select the first and second versions of the video content item based on the obtained preferences. In such embodiments, instruction set 212a stored on storage medium 210a of terminals 202a may store instructions similar to instructions 112 and 116 of FIG. 5A, for execution thereof by processor 208a. Similarly, instruction set 212b stored on storage medium 210b of terminal 202b may store instructions similar to instructions 122 and 126 of FIG. 5A, for execution thereof by processor 208b. Instruction set 222 stored on storage medium 220 of central server 201 may store instructions similar to instructions 114 and 124 of FIG. 5A, for execution thereof by processor 218.

In this embodiment, central server 201 must be notified of the user preferences obtained by terminals 202a and 202b, and must provide to the terminals the selected versions of the video content item. As such, in this embodiment:

instruction set 212a of terminal 202a further has stored instructions to transmit the obtained one or more multi-purpose personal preferences of the first user to central server 201, and instructions to receive the selected first version of the video content item;

instruction set 212b of terminal 202b further has stored instructions to transmit the obtained one or more multi-purpose personal preferences of the second user to central server 201, and instructions to receive the selected second version of the video content item; and instruction set 222 of central server 201 further has stored instructions to receive one of more multi-purpose personal preferences of the first user, instructions to receive one or more multi-purpose personal preferences of the second user, instructions to transmit the selected first version of the video content item to terminal 202a, and instructions to transmit the selected second version of the video content item to terminal 202b.

As another example, in a second embodiment, the terminals 202a and 202b may be the ones who obtain corresponding user preferences, whereas the central server 201 is the one to select the first and second versions of the video content item based on the obtained preferences and to cause the corresponding display devices to play the selected versions of the video content item. In such embodiments, instruction set 212a stored on storage medium 210a of terminals 202a may store instructions similar to instructions 112 of FIG. 5A, for execution thereof by processor 208a. Similarly, instruction set 212b stored on storage medium 210b of terminal 202b may store instructions similar to instructions 122 of FIG. 5A, for execution thereof by processor 208b. Instruction set 222 stored on storage medium 220 of central server 201 may store instructions similar to instructions 114, 116, 124, and 126 of FIG. 5A, for execution thereof by processor 218.

In this embodiment, central server 201 must be notified of the user preferences obtained by terminals 202a and 202b. As such, in this embodiment:

instruction set 212a of terminal 202a further has stored instructions to transmit the obtained one or more multi-purpose personal preferences of the first user to central server 201;

instruction set 212b of terminal 202b further has stored instructions to transmit the obtained one or more multi-purpose personal preferences of the second user to central server 201; and instruction set 222 of central server 201 further has stored instructions to receive one of more multi-purpose personal preferences of the first user, and instructions to receive one or more multi-purpose personal preferences of the second user.

As yet another example, in a third embodiment, the terminals 202a and 202b may be the ones who cause the corresponding display devices to play the selected versions of the video content item, whereas the central server 201 is the one to obtain corresponding user preferences and to select the first and second versions of the video content item based on the obtained preferences. In such embodiments, instruction set 212a stored on storage medium 210a of terminals 202a may store instructions similar to instructions 116 of FIG. 5A, for execution thereof by processor 208a. Similarly, instruction set 212b stored on storage medium 210b of terminal 202b may store instructions similar to instructions 126 of FIG. 5A, for execution thereof by processor 208b. Instruction set 222 stored on storage medium 220 of central server 201 may store instructions similar to instructions 112, 114, 122, and 124 of FIG. 5A, for execution thereof by processor 218.

In this embodiment, central server 201 must provide to the terminals the selected versions of the video content item. As such, in this embodiment:

instruction set 212a of terminal 202a further has stored instructions to receive the selected first version of the video content item;

instruction set 212b of terminal 202b further has stored instructions to receive the selected second version of the video content item; and instruction set 222 of central server 201 further has stored instructions to transmit the selected first version of the video content item to terminal 202a, and instructions to transmit the selected second version of the video content item to terminal 202b.

It will be appreciated by people skilled in the art that, although the disclosure provides several exemplary mechanisms of distributing operations between central server 201 and terminals 202a and 202b, any suitable distribution is considered within the scope of the present invention.

In some embodiments, at least one of processors 208a, 208b, and 218 is associated with a non-volatile storage device 230. In some embodiments storage device 230 may form part of central server 201 and/or of terminals 202a and 202b, whereas in other embodiments storage device 230 may be remote from system 200, while still being accessible to the processors, for example using a suitable communication mechanism such as a transceiver. Which of processors 208a, 208b, and 218 are associated with storage device 230 is dependent on the distribution of instructions between instruction sets 212a, 212b, and 222. More specifically, in some embodiments, the processor(s) which carry out the instructions to select the first and second versions of the video content items are associated with storage device 230.

In some embodiments, storage device 230 has stored multiple versions of the video content item, including the selected first and second versions of the video content item. In some such embodiments, each of the following instructions is included in at least one of instruction sets 212a, 212b, and 222:

instructions (similar to instructions 132a of FIG. 5A) that when executed by a processor, retrieve the selected first version of the video content item from non-volatile storage device 230; and instructions (similar to instructions 132b of FIG. 5A) that when executed by a processor, retrieve the second version of the video content item from non-volatile storage device 230.

These additional instructions to retrieve the first and second versions of the video content item are executed following selection of the first and second versions of the video content item, respectively. In some embodiments, these instructions are executed by the same processor(s) that executed the instructions to select the first and second versions of the video content item, respectively. In other embodiments, one processor, for example processor 220, may execute instructions to select the first version of the video content item, and another processor, for example processor 210a, may execute instructions to retrieve the selected first version. Similarly, one processor, for example processor 220, may execute instructions to select the second version of the video content item, and another processor, for example processor 210b, may execute instructions to retrieve the selected second version.

The additional instructions to retrieve the first and second versions of the video content item are executed prior to causing display of the first and second versions of the video content item, respectively. In some embodiments, these instructions are executed by the same processor(s) that will execute the instructions to cause display of the first and second versions of the video content item, respectively. In other embodiments, one processor, for example processor 220, may execute instructions to retrieve the first version of the video content item, and another processor, for example processor 210a, may execute instructions to cause display of the selected first version. Similarly, one processor, for example processor 220, may execute instructions to retrieve the second version of the video content item, and another processor, for example processor 210b, may execute instructions to cause display of the selected second version.

In some embodiments, storage device 230 has stored, for at least one specific video scene of the video content item, multiple versions of the specific video scene, substantially as described hereinabove with respect to FIG. 5A.

In some such embodiments, in which multiple versions of the specific video scene are stored in storage device 230, each of the following instructions is included in at least one of instruction sets 212a, 212b, and 222:

instructions (similar to instructions 134a of FIG. 5A) that when executed by a processor, retrieve from non-volatile storage device 230 the first version of the specific scene, which first version of the specific scene is included in the first version of the video content item; and instructions (similar to instructions 134b of FIG. 5A) that when executed by a processor, retrieve from non-volatile storage device 230 the second version of the specific scene, which second version of the specific scene is included in the second version of the video content item.

These additional instructions to retrieve the first and second versions of the specific scene are executed following selection of the first and second versions of the video content item, respectively. In some embodiments, these instructions are executed by the same processor(s) that executed the instructions to select the first and second versions of the video content item, respectively. In other embodiments, one processor, for example processor 220, may execute instructions to select the first version of the video content item, and another processor, for example processor 210a, may execute instructions to retrieve the first version of the specific scene selected for the first version of the video content item. Similarly, one processor, for example processor 220, may execute instructions to select the second version of the video content item, and another processor, for example processor 210b, may execute instructions to retrieve the second version of the specific scene selected for the second version of the video content item.

In some such embodiments, the additional instructions to retrieve the first and second versions of the specific scene are executed prior to the beginning of causing display of the first and second versions of the video content item, respectively. In some embodiments, these instructions are executed by the same processor(s) that will execute the instructions to cause display of the first and second versions of the video content item, respectively. In other embodiments, one processor, for example processor 220, may execute instructions to retrieve the first version of the specific scene selected for the first version of the video content item, and another processor, for example processor 210a, may execute instructions to cause display of the selected first version. Similarly, one processor, for example processor 220, may execute instructions to retrieve the second version of the specific scene selected for the second version of the video content item, and another processor, for example processor 210b, may execute instructions to cause display of the selected second version.

In other such embodiments, in which multiple versions of the specific video scene are stored in storage device 230, the first and second versions of the video content item are dynamically obtained during playing thereof. In some such embodiments, each of the following instructions is included in at least one of instruction sets 212a, 212b, and 222:

Instructions (similar to instructions 136a of FIG. 5A) that when executed by a processor after the first terminal 202a has started to play the first version of the video content item, retrieve from non-volatile storage device 230 the first version of the specific scene, which first version of the specific scene is included in the first version of the video content item; and instructions (similar to instructions 136b of FIG. 5A) that when executed by as processor after the second terminal 202b has started to play the second version of the video content item, retrieve from non-volatile storage device 230 the second version of the specific scene, which second version of the specific scene is included in the second version of the video content item.

In such embodiment as well, the retrieval of the first and second versions of the specific video scene may be carried out by the same processor(s) that selected the first and second versions of the video content items, respectively, or by different processors, and may be carried out by the same processor(s) that cause display of the first and second versions of the video content items, respectively, or by different processors.

A method for customizing a video content item according to personal preferences of users, while keeping a common storyline for all customizations of the video content item according to an embodiment of the teachings herein is now described with respect to FIG. 6. In the following description, the method is described as being implemented using the system of FIG. 5A, although it may be implemented using any suitable system or device, for example the system of FIG. 5B.

As in the description of FIG. 5A, for the sake of clarity, the method is described with respect to first and second users associated with respective first and second terminals. However, the method is applicable to any number of users and terminals associated therewith.

The following description relates to an example of two users, Jacob and Adam, watching a tennis game between Nadal and Federer as the video content item. However, the method is relevant to any type of video content item, as described in detail hereinabove.

Specifically, in some embodiments, the first and second users are different users, as in the example of Jacob and Adam, while in other embodiments the first and second users are the same user, for example watching a single video content item at two different points in time.

Additionally, in some embodiments, the first and second terminals are different terminals, as described herein with respect to the example of Jacob and Adam which are assumed to use their respective personal terminals, while in other embodiments the first and second terminals are the same terminal, for example two siblings having different personal preferences watching two versions of the same movie on the family TV set at two different points in time.

In some embodiments, at least one of the first and second terminals includes a smart TV. In some embodiments, at least one of the first and second terminals includes a Set-Top Box.

As seen in FIG. 6, at step 252, processor(s) 108 of system 100 execute instructions 112, and obtain first one or more multi-purpose personal preferences of the first user. Examples of such multi-purpose preferences may include preferred actors, preferred sports players, preferred zoom states, preferred field of view characteristics, and any other suitable characteristics, for example as described in the examples hereinabove.

For example, at step 252 processor(s) 108 may obtain Jacob's preferences of "favored tennis players: Nadal, Djokovic, Serena Williams" and "favored angle for tennis match: facing favored player".

In some embodiments, processor(s) 108 may obtain at least some of the personal preferences of the first user by receiving them directly from the first user. For example, the first user may manually provide the personal preferences using an input device, such as a keyboard or touchpad, via a suitable user interface, as described in detail hereinabove.

In some embodiments, processor(s) 108 may obtain at least some of the personal preferences of the first user by automatically deriving them from actions and/or choices of the first user during one or more previous sessions of playing video content items, as described in detail hereinabove.

At step 254, which takes place subsequent to obtaining the personal preferences of the first user, processor(s) 108 execute instructions 114 and automatically select a first version of the video content item from multiple versions of the video content item. The selection of the first version is based on the personal preferences of the first user, obtained at step 252.

Returning to the example of the first user Jacob, since Jacob's preferred angle is facing the favored tennis player, and his list of favored tennis players is identified in his personal preferences as including Nadal, the selected first version of the tennis game would be one showing most of the game from a camera facing Nadal.

At step 256, which takes place subsequent to selection of the first version of the video content item at step 254, processor(s) 108 execute instructions 116 and cause the first terminal to play the first version of the video content item on a display device associated with the first terminal. In the present example, the selected version of the tennis game, which mostly shows the game from a camera facing Nadal, is played by Jacob's smart TV on its screen.

At step 262, processor(s) 108 of system 100 execute instructions 122, and obtain second one or more multi-purpose personal preferences of the second user. Returning to the example above, at step 262 processor(s) 108 may obtain Adam's preferences of "favored tennis players: Djokovic, Federer, Kvitova" and "favored angle for tennis match: side of court".

As discussed herein with respect to step 252, in some embodiments, processor(s) 108 may obtain at least some of the personal preferences by receiving them directly from the second user, and in some embodiments processor(s) 108 may obtain at least some of the personal preferences of the second user by automatically deriving them from actions and/or choices of the second user during one or more previous sessions of playing video content items.

At step 264, which takes place subsequent to obtaining the personal preferences of the second user, processor(s) 108 execute instructions 124 and automatically select a second version of the video content item from multiple versions of the video content item. The second version of the video content item is different from the first version selected at step 254, and is compatible therewith. The selection of the second version is based on the personal preferences of the second user, obtained at step 262.

Returning to the example of the second user Adam, since Adam's preferred angle is from the side of the tennis court, the selected second version of the tennis game would be one taken from a camera at the side of the tennis court.

In some embodiments, the second version of the video content item, selected at step 264, is strictly compatible with the first version of the video content item selected at step 254.

At step 266, which takes place subsequent to selection of the second version of the video content item at step 264, processor(s) 108 execute instructions 126 and cause the second terminal to play the second version of the video content item on a display device associated with the second terminal. In the present example, the selected version of the tennis game, which is filmed from the perspective of the side of the court, is played by Adam's Set-Top Box on a television screen associated therewith.

In some embodiments, at steps 256 and 266, processor(s) 108 cause the first terminal and the second terminal to play at least a portion of the first version of the video content item and at least a portion of the second video content item simultaneously.

In some embodiments, the first version of the video content item selected at step 254 includes a first version of a video scene, and the second version of the video content item selected at step 264 includes a second version of the video scene, such that the first and second versions of the video scene are compatible with each other.

In some such embodiments including two such compatible versions of a video scene, a first portion of the first version of the video scene and a second portion of the second version of the video scene include the occurrence of an event. However, the first version of the video scene provides a view of an entirety of the event as taken by a first camera, while the second version of the video scene provides a view of the entirety of the event as taken by a second camera, different from the first camera.

In some embodiments including two such compatible versions of a video scene, a specific person is shown for a first accumulated amount of time during the first version of the video scene, and is shown for a second accumulated amount of time during the second version of the video scene, where the second accumulated amount of time is different from the first accumulated amount of time.

In some embodiments including two such compatible versions of a video scene, the face of a specific person is shown for a first accumulated amount of time during the first version of the video scene, and is shown for a second accumulated amount of time during the second version of the video scene, where the second accumulated amount of time is different from the first accumulated amount of time.

In some embodiments including two such compatible versions of a video scene, a first portion of the first version of the video scene and a second portion of the second version of the video scene both include the occurrence of an event. However, the first version of the video scene provides a view of an entirety of the event using a first field of view, while the second version of the video scene provides a view of the entirety of the event using a second field of view, different from the first field of view.

In some embodiments including two such compatible versions of a video scene, a first portion of the first version of the video scene and a second portion of the second version of the video scene both include the occurrence of an event. However, the first version of the video scene provides a view of an entirety of the event as it is seen by a first character participating in the video content item, while the second version of the video scene provides a view of the entirety of the event as it is seen by a second character participating in the video content item, where the second character is different from the first character.

In some embodiments, multiple versions of the video content item, including the first and second versions of the video content items selected at steps 254 and 264 respectively, are prepared in advanced, and are stored in a non-volatile storage device.

In some such embodiments, at step 272a, which takes place subsequent to selection of the first version of the video content item at step 254 and prior to causing playing of the first version of the video content item at step 256, the selected first version of the video content item is retrieved from the non-volatile storage device. Similarly, at step 272b, which takes place subsequent to selection of the second version of the video content item at step 264 and prior to causing playing of the second version of the video content item at step 266, the selected second version of the video content item is retrieved from the non-volatile storage device.

In some embodiments, the multiple versions of the video content items (including the first and second versions selected at steps 254 and 264 respectively) are not prepared in advanced. In some such embodiments, multiple versions of one or more scenes, included in the multiple versions of the video content item, are prepared and stored in advance in a non-volatile storage device, and are used to assemble the versions of the video content item. The following description relates to a single specific video scene having multiple versions, but is equally applicable to more than one such video scene.

In some such embodiments, at step 274a, which takes place subsequent to selection of the first version of the video content item at step 254, a first version of the specific video scene, which will be included in the playing of the first version of the video content item, is retrieved from the non-volatile storage device. Similarly, at step 274b, which takes place subsequent to selection of the second version of the video content item at step 264, a second version of the specific video scene, which will be included in the playing of the second version of the video content item, is retrieved from the non-volatile storage device.

In some such embodiments, the first and second versions of the video content item are assembled from the multiple versions of one or more scenes prior to starting playing the first and second versions of the video content items. In these cases, steps 274a and 274b take place prior to steps 256 and 266, respectively. In other such embodiments, the first and second versions of the video content items are never fully assembled, but rather are constructed dynamically while the video content item is playing. In these cases, with the exception of the opening video scene of the video content item, steps 274a and 274b take place following starting of playing the first and second versions of the video content item, caused by execution of steps 256 and 266, respectively.

In some embodiments, the playing of the first and second versions of the video content item is, or includes, real-time broadcasts of a common program. In some such embodiments, a first portion of the first version of the video content item and a second portion of the second version of the video content both include a common event. However, the first version of the video content item provides a view of an entirety of the event, as taken by a first camera, while the second version of the video content item provides a view of the entirety of the event as taken by a second camera, different from the first camera.

Definitions

This disclosure, including the description of the invention and the claims, should be interpreted according to the definitions below.

In case of a contradiction between the definitions provided herein and other sections of this disclosure, these definitions should prevail.

In case of a contradiction between the definitions provided herein and a definition or a description in any other document, including in another document included in this disclosure by reference, these definitions should prevail, even if the definition or the description in the other document is commonly accepted by a person of ordinary skill in the art.

1) "content"—information and experiences that are directed towards an end-user or audience.
2) "content item"—a stand-alone unit of content that can be referred to and uniquely identified by a single reference and can be retrieved and displayed independently of other content. For example, a movie, a TV series, a still image, or a paragraph of text.
3) "media content item"—a content item that contains media content. For example, a movie, a TV program, an episode of a TV series, a video clip, an animation, an audio clip, or a still image.
4) "non-media content item"—a content item that is not a media content item. For example, a paragraph of text.
5) "audio content item"—a media content item that contains only an audio track hearable using a speaker or a microphone.
6) "video content item"—a media content item that contains a visual track viewable on a screen. A video content item may or may not additionally contain an audio track.
7) "audio" and "aural" are used as synonyms herein.
8) "video" and "visual" are used as synonyms herein.
9) "audio channel" and "audio track" are used as synonyms herein. Both refer to an audio component of a media content item.
10) "video channel" and "video track" are used as synonyms herein. Both refer to a video component of a media content item. A still image is a special case of video track.
11) "content playing device"—a device that is capable of playing or displaying at least some content items. For example, a graphic engine that is capable of displaying paragraphs of text, a combined video/audio player that is capable of playing in parallel both the video channel and the audio channel of at least some media content items.
12) "media playing device"—a device that is capable of playing or displaying at least some media content items. For example, an audio-only player that is capable of playing at least some audio content items, a video-only player that is capable of playing the video track of at least some video content items, a combined video/audio player that is capable of playing in parallel both the video channel and the audio channel of at least some media content items.
13) "playing media content"—outputting at least one of a video channel and an audio channel of the media content to a visual output device (for example a TV screen) or to an audio output device (for example a speaker or headphones). If the media content is a still image, then playing it means outputting the still image to a visual output device. If the media content is video content that has both a video channel and an audio channel, then playing it means outputting both the video channel and the audio channel to a visual output device and to an audio output device, respectively. Pausing a video content item in the middle of playing is considered playing the video content item. Also, showing the last frame of a video content item after it was played to its end is considered playing the video content item.
14) "displaying a media content item"—outputting a video channel of the media content item to a visual output device (for example a TV screen). If the media content item is a still image, then displaying it means outputting the still image to a visual output device. Pausing a video content item in the middle of playing it is considered displaying it. Also, showing the last frame of a video content item after it was played to its end is considered displaying the video content item.
15) "displaying a non-media content item"—outputting a visual image of the non-media content item to a visual output device (for example outputting a visual image of a paragraph of text to a computer screen).
16) "video shot" (also referred to herein as "shot")—A continuous sequence of frames within a video content item that were continuously recorded by the same camera. A video shot is a physical entity that does not deal with the semantic meaning of its content.
17) "video scene" (also referred to herein as "scene")—A collection of one or more semantically-related and temporally adjacent video shots depicting and conveying a high-level concept or story. In other words, a video scene is a semantic entity that is a continuous portion of a video content item and has an independent identity of its own. For example, one news item of a news program or a car chase scene of an action movie. Typically there are multiple video scenes within a video content item, but a video scene may also be the only one within its video content item, as may be the case for a short music video clip.
18) "video segment" (also referred to herein as "segment")—A continuous portion of a video content item that is strictly smaller than the enclosing video content item. A video segment may coincide with a video shot or with a video scene, but does not have to. That is—a video segment may be a single shot, multiple shots, a portion of a shot, multiple shots plus a portion of a shot, a single scene, multiple scenes, a portion of a scene, or multiple scenes plus a portion of a scene.

It should be emphasized that a video segment extracted from its enclosing video content item and put back into a library or collection of video content items as a stand-alone video item, is no longer considered to be a video segment and becomes a video content item of its own. This is so even if the enclosing video content item from which the segment was extracted is available in the same library or collection. That is, a car chasing scene extracted from a movie and posted as a short video in YouTube is no longer a video segment for the purpose of the present solution.

19) "strictly larger"—Larger and not equal to.
20) "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.
21) "one of A and B"—If A and B are specific items, then "one of A and B" is equivalent to "only A or only B, but not both". For example, "one of John and Mary" is equivalent to "only John or only Mary, but not both John and Mary". If A and B are categories, then "one of A and B" is equivalent to "only one of A or only one of B, but not both one of A and one of B". For example, "one of a dog and a cat" is equivalent to "only one dog or only one cat, but not both one dog and one cat".

Similarly, if A and B are specific items, then "at least one of A and B" is equivalent to "only A or only B, or both A and B". For example, "at least one of John and Mary" is equivalent to "only John or only Mary, or both John and Mary". If A and B are categories, then "at least one of A and B" is equivalent to "only at least one of A or only at least one of B, or both at least one of A and at least one of B". For example, "at least one of a dog and a cat" is equivalent to "only at least one dog or only at least one cat, or both at least one dog and at least one cat". Note that in "one of dogs and cats", "dogs" and "cats" are not categories but specific groups (i.e. specific items). Therefore, "one of dogs and cats" is equivalent to "only dogs or only cats, but not both dogs and cats". Similarly, "at least one of dogs and cats" is equivalent to "only dogs or only cats, or both dogs and cats".

If A, B and C are specific items, then "one of A, B and C" is equivalent to "only A or only B or only C, but not a combination of two or three members of the group consisting of: A, B and C", and "at least one of A, B and C" is equivalent to "only A or only B or only C, or any combination of two or three members of the group consisting of: A, B and C".

If A, B and C are categories, then "one of A, B and C" is equivalent to "only one of A or only one of B or only one of C, but not a combination of two or three members of the group consisting of: one of A, one of B and one of C", and "at least one of A, B and C" is equivalent to "only at least one of A or only at least one of B or only at least one of C, or any combination of two or three members of the group consisting of: one of A, one of B and one of C".

If the list following the "one of" or the "at least one of" contains more than three members, then the previous definitions are again applicable, with the appropriate modifications that extrapolate the above logic.

Note that "one or more of" is equivalent to "at least one of", and the two terms are synonyms.

22) "a first version of a video scene and a second version of the same video scene are compatible with each other" (or simply "compatible")—The facts visible to a user when watching the first version of the video scene and the facts visible to a user when watching the second version of the video scene do not contradict each other and can be both true at the same time. Note that the first version may show facts that are not shown by the second version and the second version may show facts that are not shown by the first version, but as long as there is no contradiction between the facts shown by one version and the facts shown by the other version the two versions are compatible. Also note that the two versions need not be of the same time length in order to be compatible.

Two versions of the same video scene that are not compatible with each other are said to be incompatible with each other.

As an example, if the video scene is a shootout scene, and in a first version of the scene a certain character is being hit by a bullet and gets killed, while in a second version of that scene the certain character is being hit by a bullet but survives, then the two versions are incompatible—one cannot get killed and survive at the same time. However, if in the first version of the shootout scene a certain character is being hit and gets killed, while in the second version the certain character is seen being hit and falling on the ground without disclosing to the user additional details, then the two versions are compatible, as it is possible that all disclosed facts are true—it is possible that the certain character was hit by a bullet, fell to the ground and died.

As another example, if the video scene is a conversation between two people, and in a first version of the scene the face of a one of the two characters is shown most of the time, while in a second version of that scene the face of the other character is shown most of the time, then the two versions are compatible, provided that the words spoken during the conversation are the same in both versions. However, if the spoken words are not the same in the two versions, then the two versions are incompatible, even if both show the face of the same character at all time.

In order for the term "compatible versions of a video scene" to be meaningful, the two versions being compared should correspond to a common storyline and should relate to one or more common facts within the common storyline. If the two versions correspond to different and non-related storylines or do not relate to at least one common fact within the common storyline, then it is meaningless to speak about their compatibility. In such case the two versions being compared are neither compatible nor incompatible.

For example, if one version of a video scene shows a person knocking on a house door, with the video taken from a camera placed in the street, and the other version shows another person walking towards the door to open it in response to the knock being heard, with the video taken from a camera located inside the house, then the two versions of the scene are compatible. Note that in this example the two versions are compatible even though the two cameras do not share any image. However, both versions relate to a common fact of the storyline—a knock on the door, and therefore they are compatible.

On the other hand, if one version of a video scene shows a man sitting in his car in front of a house, and another version shows a girl inside the house dressing for going out for a date, then the two versions do not share any common fact of the storyline—the two versions may be shifted in time relative to each other without creating any contradiction. Consequently, these two versions are neither compatible nor incompatible. Note that in this example the two versions may indeed correspond to a common storyline (the girl may be dressing for going out for a date with the man sitting in the car), but the lack of a common fact makes their compatibility meaningless.

However, if in the last example (the one with the man sitting in a car in front of a house) the man is shown talking on the phone while sitting in the car and saying that he is currently in front of his girlfriend's house and is waiting for her to dress up for their date and come out, then the two versions do share a common fact of the storyline—the fact that the girl is currently dressing for going out for a date with the man is the car, and consequently the two versions are compatible.

It should be noted that in this last example (the one with the man sitting in a car while talking on the phone about his girlfriend currently dressing up), the two versions are compatible even if the car in which the man is sitting is not parked near the house in which the girl is dressing up—the common fact is shared between the two versions regardless of physical location.

23) "a first version of a video content item and a second version of the same video content item are compatible with each other" (or simply "compatible")—The two versions include the exact same sequence of video scenes, and for each given video scene included in the two versions, either (i) a common version of the given video scene appears in both versions of the video content item, or (ii) different versions of the given video scene appear in the two versions of the video content item, and the two different versions of the given video scene are compatible with each other.

Note that according to the definition, in the following cases the two versions of a video content item are not compatible: (i) All the video scenes appearing in the first version also appear in the second version, except for one video scene that appears in the first version but is skipped in the second version, (ii) All the video scenes appearing in the first version also appear in the second version, except that their order is not the same (e.g. the order of two adjacent video scenes is switched in the second version compared to the first version), (iii) both versions of the video content item include the same scenes having the same version and in exactly the same order, except for one scene that appears in two different versions that are incompatible with each other.

Two versions of the same video content item that are not compatible with each other are said to be incompatible with each other.

Note that, as a result of the definition of compatibility between different versions of video scenes, in order for the term "compatible versions of a video content item" to be meaningful, the two versions of the video content item being compared should include only pairs of corresponding scenes that are either identical or are two different versions for which compatibility is meaningful (i.e. the two versions of the video scene share a common storyline and at least one common fact within the common storyline). If at least one pair of corresponding scenes of the two versions of the video content item does not meet that requirement (i.e. the two versions of the video scene correspond to different and non-related storylines or do not relate to at least one common fact within the common storyline), then it is meaningless to speak about the compatibility of the two versions of the video content item, as their corresponding video scenes are neither compatible nor incompatible. In such case the two versions of the video content item being compared are also neither compatible nor incompatible.

24) "a first version of a video scene and a second version of the same video scene are strictly compatible with each other" (or simply "strictly compatible")—The first version of the video scene and the second version of the video scene are compatible with each other, and in addition they include one or more common facts of the common storyline that explicitly appear in visual images of each of the two versions.

For example, if one version of a video scene shows a person knocking on a house door, with the video taken from a camera placed in the street, and the other version shows another person walking towards the door to open it in response to the knock being heard, with the video taken from a camera located inside the house, and this is the only fact common to the two versions (i.e. there are no common facts visible in the visual images of the two versions), then the two versions of the scene are not strictly compatible (even though they are compatible).

Similarly, if one version of a video scene shows a man sitting in his car in front of a house, talking on the phone while sitting in the car and saying that he is currently in front of his girlfriend's house and is waiting for her to dress up for their date and come out, and another version shows a girl inside the house dressing for going out for a date, and this is the only fact common to the two versions (i.e. there are no common facts visible in the visual images of the two versions), then the two versions of the scene are not strictly compatible (even though they are compatible).

However, if one version of a video scene shows a game of tennis with the video taken from a camera placed high above the game court, and the other version shows the same game of tennis with the video taken from a camera place behind one of the two players, and there is no contradiction between the two versions, then the two versions of the scene are strictly compatible, even though not a single fact of the scene is shown from the same direction in both versions.

Note that the term "strictly compatible versions of a video scene" is only meaningful when the two versions are compatible.

25) "a first version of a video content item and a second version of the same video content item are strictly compatible with each other" (or simply "strictly compatible")—The first version of the video content item and the second version of the video content item are compatible with each other, and in addition, for each given video scene included in the two versions of the video content item, either (i) a common version of the given video scene appears in both versions of the video content item, or (ii) different versions of the given video scene appear in the two versions of the video content item, and the two different versions of the given video scene are strictly compatible with each other.

Note that the term "strictly compatible versions of a video content item" is only meaningful when the two versions are compatible.

26) "multi-purpose personal preference of a user"—A personal preference of the user whose use may lead to making different selections in different selection events. For example, the personal preference "prefers comedies" may cause a selection of the movie "Borat" in a first event, a selection of some episode of the TV series "Friends" in a second event, and a selection of a comic version of a given video scene from multiple versions of the given video scene in a third event. Similarly, the personal preference "prefers Angelina Jolie" may cause a selection of the movie "Mr. and Mrs. Smith" in a first event, a selection of the movie "Original Sin" in a second event, and for a given video scene in which Angelina Jolie appears, a selection of a version of the given video scene in which Angelina's face is shown on the screen during most of the scene in a third event. In contrast, the preference "prefers Gone with the Wind" can only result in selecting the movie "Gone with the Wind" and nothing else, and is therefore not a multi-purpose personal preference.

27) "accumulated amount of time"—The sum of the time lengths of a set of time intervals. For example, the accumulated amount of time during the playing of a video scene in which a given character is shown, is determined by the following steps: (i) determining all the time intervals of the video scene in which the given character is continuously shown, thereby obtaining one or more non-overlapping time intervals in which the given character is continuously shown during the full span of each of the time intervals, (ii) determining the time length of each of the one or more time intervals, and (iii) summing the time length of the one or more time intervals, thereby obtaining the accumulated amount of time in which the given character is shown during the video scene.

28) "a device associated with a processor"—A device (e.g. a storage device) that is accessible to the processor regardless of physical distance between the device and the processor. For example, a solid-state storage device that is accessible by a processor and is packaged in a common enclosure with the processor is associated with the processor. As another example, a magnetic hard drive accessible by a local processor but located in the cloud is also associated with the local processor.

29) "an event (in a video content item)"—Something that occurs (seen or heard) in the video content item (in the video channel, the audio channel or in both channels of the video content item).

The time boundaries associated with an event are not uniquely determined by the occurrence defining the event. For example, if the occurrence is the scoring of a goal in a soccer game then the time boundaries of the event may be from the time in which the attack started in the middle of the soccer field to the time in which the player scoring the goal finished celebrating his goal. Alternatively, the time boundaries of that event may be from the time in which the player scoring the goal received the ball to the time in which the ball hit the goal's net. Other alternatives may be from the beginning of the enclosing scene to the time in which the player scoring the goal finished celebrating his goal, or from the time in which the player scoring the goal received the ball to the end of the enclosing scene. Consequently, the choosing of the time boundaries surrounding an event is somewhat arbitrary, but is restricted by requiring the starting time and the ending time of the event to coincide with a meaningful moment (e.g. the time at which the attack in which the goal was scored started in the middle of the soccer field, the time at which the player scoring the goal received the ball, the time at which the player scoring the goal finished celebrating his goal, the time at which the ball hit the goal's net, the beginning of the enclosing scene, the ending time of the enclosing scene). As a result, the time interval corresponding to "the entirety of an event" depends on the specific choice made for the time boundaries surrounding the event.

It will be appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A method for customizing a video content item according to personal preferences of at least first and second users, while keeping a common storyline for all customizations of the video content item, wherein the first user is associated with a first terminal and the second user is associated with a second terminal, the method comprising:
 a. obtaining first one or more multi-purpose personal preferences of the first user;
 b. subsequent to said obtaining of said first one or more multi-purpose personal preferences, automatically selecting a first version of the video content item from multiple versions of the video content item, said automatically selecting of said first version of the video content item being based on said first one or more multi-purpose personal preferences;
 c. subsequent to said automatically selecting of said first version of the video content item, causing a first playing of said first version of the video content item on a display device associated with the first terminal;
 d. obtaining second one or more multi-purpose personal preferences of the second user, said second one or more multi-purpose personal preferences being different from said first one or more multi-purpose personal preferences;
 e. subsequent to said obtaining of said second one or more multi-purpose personal preferences, automatically selecting a second version of the video content item from said multiple versions of the video content item, wherein (i) said second version of the video content item is different from said first version of the video content item, (ii) said second version of the video content item is compatible with said first version of the video content item, and (iii) said automatically selecting of said second version of the video content item is based on said second one or more multi-purpose personal preferences; and
 f. subsequent to said automatically selecting of said second version of the video content item, causing a second playing of said second version of the video content item on a display device associated with the second terminal,
 wherein:
  (i) said first version of the video content item includes a first version of a video scene;
  (ii) said second version of the video content item includes a second version of said video scene, such that said first version of said video scene and said second version of said video scene are compatible with each other;

(iii) during a first portion of said first version of said video scene, which first portion includes an occurrence of an event, said first version of said video scene provides a view of an entirety of said event as it is seen by a first character participating in said video content item; and (iv) during a second portion of said second version of said video scene, which second portion includes said occurrence of said event, said second version of said video scene provides a view of said entirety of said event as it is seen by a second character participating in said video content item, said second character being different from said first character.

2. The method of claim 1, wherein said second version of the video content item is strictly compatible with said first version of the video content item.

3. The method of claim 1, wherein the second user is different from the first user.

4. The method of claim 1, wherein the second user and the first user are the same user.

5. The method of claim 1, wherein the second terminal is different from the first terminal.

6. The method of claim 1, wherein the second terminal and the first terminal are the same terminal.

7. The method of claim 1, wherein said causing said first playing and said causing said second playing comprise causing at least a portion of said first playing and at least a portion of said second playing to occur simultaneously.

8. The method of claim 1, wherein:
(i) said first version of the video content item includes a first version of a second video scene;
(ii) said second version of the video content item includes a second version of said second video scene, such that said first version of said second video scene and said second version of said second video scene are compatible with each other;
(iii) during a first portion of said first version of said second: video scene, which first portion includes an occurrence of a second event, said first version of said second video scene provides a view of an entirety of said second event as taken by a first camera; and
(iv) during a second portion of said second version of said second video scene, which second portion includes said occurrence of said second event, said second version of said second video scene provides a view of said entirety of said second event as taken by a second camera, different from said first camera.

9. The method of claim 1, wherein:
(i) said first version of the video content item includes a first version of a second video scene;
(ii) said second version of the video content item includes a second version of said second video scene, such that said first version of said second video scene and said second version of said second video scene are compatible with each other;
(iii) during said first version of said second video scene, a specific person is shown for a first accumulated amount of time; and
(iv) during said second version of said second video scene, said specific person is shown for a second accumulated amount of time, different from said first accumulated amount of time.

10. The method of claim 1, wherein:
(i) said first version of the video content item includes a first version of a second video scene;
(ii) said second version of the video content item includes a second version of said second video scene, such that said first version of said second video scene and said second version of said second video scene are compatible with each other;
(iii) during said first version of said second video scene, a specific person's face is shown for a first accumulated amount of time; and
(iv) during said second version of said second video scene, said specific person's face is shown for a second accumulated amount of time, different from said first accumulated amount of time.

11. The method of claim 1, wherein:
(i) said first version of the video content item includes a first version of a second video scene;
(ii) said second version of the video content item includes a second version of said second video scene, such that said first version of said second video scene and said second version of said second video scene are compatible with each other;
(iii) during a first portion of said first version of said second video scene, which first portion includes an occurrence of a second event, said first version of said second video scene provides a view of an entirety of said second event using a first field of view; and
(iv) during a second portion of said second version of said second video scene, which second portion includes said occurrence of said second event, said second version of said second video scene provides a view of said entirety of said second event using a second field of view, different from said first field of view.

12. The method of claim 1, wherein said multiple versions of the video content item, including said first version of the video content item and said second version of the video content item, are stored in a non-volatile storage device, and wherein the method further comprises:
g. prior to said causing said first playing, retrieving said first version of said video content item from said non-volatile storage device; and
h. prior to said causing said second playing, retrieving said second version of said video content item from said non-volatile storage device.

13. The method of claim 1, wherein, for at least one specific video scene of the video content item, multiple versions of said specific video scene are stored in a non-volatile storage device, and wherein the method further comprises:
g. prior to said causing said first playing, retrieving from said non-volatile storage device a first version of said specific video scene, said retrieved first version of said specific video scene being included in said first playing of the video content item; and
h. prior to said causing said second playing, retrieving from said non-volatile storage device a second version of said specific video scene, different from said retrieved first version of said specific video scene, said retrieved second version of said specific video scene being included in said second playing of the video content item.

14. The method of claim 1, wherein, for at least one specific video scene of the video content item, multiple versions of said specific video scene are stored in a non-volatile storage device, and wherein the method further comprises:
g. retrieving from said non-volatile storage device, subsequent to starting said first playing of the video content item by the first terminal, a first version of said specific video scene, said retrieved first version of said specific video scene being included in said first playing of the video content item; and h. retrieving from said non-volatile storage device, subsequent to starting said second playing of the video content item by the second terminal, a second version of said specific video scene, different from said retrieved first version of said specific video scene, said retrieved second version of said specific video scene being included in said second playing of the video content item.

15. The method of claim 1, wherein (i) said first playing and said second playing of the video content item include real-time broadcasts of a common event, (ii) during a first portion of said first version of the video content item, which first portion includes said common event, said first version of the video content item provides a view of an entirety of said common event as taken by a first camera, and (iii) during a second portion of said second version of the video content item, which second portion includes said common event, said second version of the video content item provides a view of said entirety of said common event as taken by a second camera, different from said first camera.

16. The method of claim 1, wherein said obtaining of said first one or more multi-purpose personal preferences of the first user comprises automatically deriving at least some of said one or more multi-purpose personal preferences of the first user from actions of the first user during one or more previous sessions of playing video content items.

17. A system for customizing a video content item according to personal preferences of at least first and second users, while keeping a common storyline for all customizations of the video content item, the system being functionally associated with a first terminal associated with the first user and a second terminal associated with the second user, the system comprising:

a. at least one processor in communication with the first terminal and the second terminal;

b. at least one non-transitory computer readable storage medium for instructions execution by said at least one processor, said at least one non-transitory computer readable storage medium having stored:

i. instructions to obtain first one or more multi-purpose personal preferences of the first user;

ii. instructions, to be executed subsequent to execution of said instructions to obtain said first one or more multi-purpose personal preferences, to automatically select a first version of the video content item from multiple versions of the video content item, said automatic selection of said first version of the video content item being based on said first one or more multipurpose personal preferences;

iii. instructions, to be executed subsequent to said execution of said instructions to automatically select said first version of the video content item, to cause a first playing of said first version of the video content item on a display device associated with the first terminal;

iv. instructions to obtain second one or more multi-purpose personal preferences of the second user, said second one or more multi-purpose personal preferences being different from said first one or more multipurpose personal preferences;

v. instructions, to be executed subsequent to execution of said instructions to obtain second one or more multi-purpose personal preferences, to automatically select a second version of the video content item from said multiple versions of the video content item, wherein (i) said second version of the video content item is different from said first version of the video content item, (ii) said second version of the video content item is compatible with said first version of the video content item, and (iii) said automatic selection of said second version of the video content item is based on said second one or more multi-purpose personal preferences; and vi. instructions, to be executed subsequent to execution of said instruction to automatically select said second version of the video content item, to cause a second playing of said second version of the video content item on a display device associated with the second terminal wherein:

(i) said first version of the video content item includes a first version of a video scene;

(ii) said second version of the video content item includes a second version of said video scene, such that said first version of said video scene and said second version of said video scene are compatible with each other;

(iii) during a first portion of said first version of said video scene, which first portion includes an occurrence of an event, said first version of said video scene provides a view of an entirety of said event as it is seen by a first character participating in said video content item; and (iv) during a second portion of said second version of said video scene, which second portion includes said occurrence of said event, said second version of said video scene provides a view of said entirety of said event as it is seen by a second character participating in said video content item, said second character being different from said first character.

18. The system of claim 17, wherein said second version of the video content item is strictly compatible with said first version of the video content item.

19. The system of claim 17, wherein:

I. said at least one processor comprises a central server processor, a first processor associated with the first terminal, and a second processor associated with the second terminal;

II. said at least one non-transitory computer readable storage medium comprises:

A) a central server non-transitory computer readable storage medium for instructions execution by said central server processor, said central server nontransitory computer readable storage medium having stored said instructions to automatically select said first version of said video content item and said instructions to automatically select said second version of said video content item, and further has stored:

1) instructions to receive from said first processor associated with said first terminal said first one or more multi-purpose personal preferences of the first user;

2) instructions to transmit to said first processor associated with said first terminal said first version of said video content item;

3) instructions to receive from said second processor associated with said second terminal said second one or more multi-purpose personal preferences of the second user; and 4) instructions to transmit to said second processor associated with said second terminal said second version of said video content item;

B) a first non-transitory computer readable storage medium for instruction execution by said first processor associated with said first terminal, said first non-transitory computer readable storage medium having stored said instructions to obtain said first one or more multi purpose personal preferences of the first user and said instructions to cause a first playing of said first version of the video content item, and further has stored:
1) instructions to transmit said first one or more multi-purpose personal preferences of said first user to said central server processor; and
2) instructions to receive from said central server processor said first version of said video content item; and C) a second non-transitory computer readable storage medium for instruction execution by said second processor associated with said second terminal, said second non-transitory computer readable storage medium having stored said instructions to obtain said second one or more multi-purpose personal preferences of the second user and said instructions to cause a second playing of said second version of the video content item, and further has stored:
1) instructions to transmit said second one or more multi-purpose personal preferences of said second user to said central server processor; and
2) instructions to receive from said central server processor said second version of said video content item.

* * * * *